United States Patent
Fetik

(10) Patent No.: US 7,743,260 B2
(45) Date of Patent: Jun. 22, 2010

(54) FIREWALL+STORAGE APPARATUS, METHOD AND SYSTEM

(76) Inventor: Richard Fetik, 1456 Teton Ave., Salinas, CA (US) 93906

( * ) Notice: Subject to any disclaimer, the term of this patent is extended or adjusted under 35 U.S.C. 154(b) by 0 days.

(21) Appl. No.: 11/803,947

(22) Filed: May 15, 2007

(65) Prior Publication Data
US 2007/0294756 A1    Dec. 20, 2007

Related U.S. Application Data

(60) Provisional application No. 60/747,536, filed on May 17, 2006.

(51) Int. Cl.
*H04L 29/06* (2006.01)
(52) U.S. Cl. .......................... 713/193; 726/11
(58) Field of Classification Search ......... 719/310–312, 719/319, 328–330; 713/193, 163
See application file for complete search history.

(56) References Cited

U.S. PATENT DOCUMENTS

| | | | |
|---|---|---|---|
| 5,896,499 A * | 4/1999 | McKelvey | 726/11 |
| 6,598,167 B2 * | 7/2003 | Devine et al. | 726/8 |
| 6,973,568 B2 * | 12/2005 | Hagerman | 713/153 |
| 2004/0010701 A1 * | 1/2004 | Umebayashi et al. | 713/193 |
| 2006/0080733 A1 * | 4/2006 | Khosmood et al. | 726/13 |
| 2006/0277600 A1 * | 12/2006 | Goodwill et al. | 726/9 |

* cited by examiner

*Primary Examiner*—Gilberto Barron, Jr.
*Assistant Examiner*—Venkat Perungavoor
(74) *Attorney, Agent, or Firm*—IPxLAW Group LLP; Claude A.S. Hamrick

(57) ABSTRACT

A storage firewall architecture, method and system that works in parallel with existing security technologies and, inter alia, provides application software authentication, user authentication & authorization in the execution of an application, examination, verification, and authentication of all storage access requests, monitoring of protected storage to detect & repair anomalous changes, encryption of protected storage, both data and software, provisioning (deployment) of patches, configuration changes, and software through a secure synchronization link to a configuration and patch management server, and server-based system administration & configuration to prevent malware from penetrating local configuration mechanisms.

32 Claims, 6 Drawing Sheets

Firewall+ System Functional Block Diagram

Interaction between Firewall+ Storage
Firewall (F+) and Application (App)

where App
- F+ API initiation request is in App startup code,
- is linked to F+ ABI, and
- App is registered in the F+ Rights table (1) App starts to run, initiates contact with F+

(2) F+ authenticates App, provides authorization credential (auth_token), where the F+ ABI keeps track of it (3) App sends 'open for read' file access request to F+, where auth_token is added to the fopen() by the F+ ABI (4) F+ (optionally logs access request), verifies App's auth_token, opens the file for read, returns a file reference – an index into the File Table (5) App sends read access request to F+, where auth_token added to the fread() by the F+ ABI, and the file pointer (fp) is F+ file reference, an index into the File Table (6) F+ (optionally logs access request), verifies App's auth_token, reads requested data from file, updates entry in the File Table indicating current position in the file, returns th requested data to the App

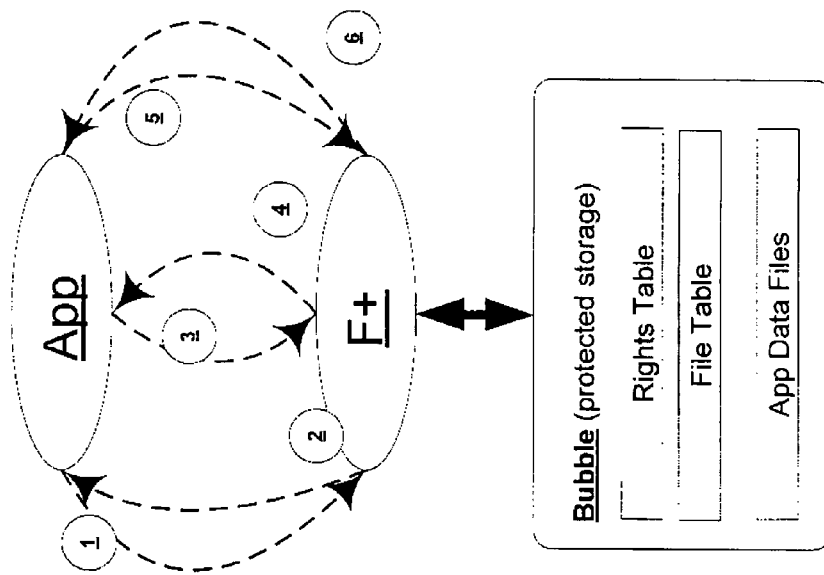

Fig. 4

Firewall+ System Functional Block Diagram

FIREWALL+STORAGE APPARATUS, METHOD AND SYSTEM

CROSS REFERENCE TO RELATED APPLICATION

This application claimed the benefit or priority to U.S. Provisional Application No. 60/747,536, filed May 17, 2006, entitled Storage Firewal and FlassApp Support Technology, the specification and drawings of which are incorporated herein by reference.

FIELD OF THE INVENTION

The present invention relates generally to electronic data storage systems and apparatus, and more particularly to an improved storage firewall architecture, method and system that works in parallel with existing security technologies and, inter alia, provides application software authentication, user authentication & authorization in the execution of an application, examination, verification, and authentication of all storage access requests, monitoring of protected storage to detect & repair anomalous changes, encryption of protected storage, both data and software, provisioning (deployment) of patches, configuration changes, and software through a secure synchronization link to a configuration and patch management server, and server-based system administration & configuration to prevent malware from penetrating local configuration mechanisms.

BACKGROUND

Network firewalls have been around for long enough that most IT professional define them as means for protecting computers on a network by filtering at the network perimeter that which is permitted to enter a local area network (LAN) from an external network. Network firewalls are usually deployed so that they can filter all attempts to reach any of the computers on the internal network. This filtering is usually aft of the IP (Internet Protocol) packet level, though more recent technologies extend this approach to higher levels of the IP network stack. (The IP network stack is the way in which the Internet protocols are layered on top of each other in order to provide a modular design to these protocols. At the bottom is the hardware layer, and at the top is the application layer. Near the bottom are the layers that are responsible for communicating with adjacent computers on the same local network, and for tunneling through to computers and other devices on non-local networks). The trend is toward an integrated network perimeter defense system that scans and filters at all levels of the IP stack. In general concept, intrusion detection systems (IDSs) and similar defensive systems have a similar mandate and approach, but they work at higher levels of the IP network stack.

Generally, network firewalls are deployed as hardware appliance implementations, though software implementations running on multi-purpose servers are still common. There is also a class of local software firewalls, so-called personal firewalls, that sit at a computer's network interface to the external world and attempt to prevent malware and undesired network access to the protected computer. These work in a manner quite similar to the network firewalls, but with differences; such as the responsibility to monitor activities on the local computer, and to detect and filter out certain behavior such as attempts by local software to access the network.

Anti-Virus (A-V) software and local software firewalls have a somewhat similar mission, i.e., to filter out malware before it can do anything, with the assumption that most viruses these days are network borne. In addition, most desktop A-V software still check floppy disks and other removable media when they are first mounted, presumably before the possibly infected contents can do any damage. It is interesting that we still need A-V software for network access protection, since one would assume that adequate firewalls would filter out all of the attempts to penetrate the protected system, including invasion attempts by viruses.

To simplify the concept, most anti-virus software focuses on what happens to files (monitoring changes to file systems, boot sector, etc.), while network firewalls focus on network sockets (ports, addresses, packets, protocols, etc.). Of course, there are other kinds of malicious software (malware) than just viruses, e.g., trojans, backdoors, worms, etc. These can be divided into 2 sets, or rather their functionality can be considered as falling into 2 basic classes: malware that knows how to propagate itself, and malware that does not.

For purposes of this description, all of the firewall, IDS, and similar mechanisms are lumped into the general category of "firewall" since the industry seems to be going this way, with tighter integration among the various layers of perimeter defenses and internal defenses. The architecture of software that protects at the network access point(s) necessarily corresponds to the architecture of the network access protocols, so the firewalls and related mechanisms filter network traffic at the same layers (i.e. they assume the same semantics) as the protected network transport layers. This is to say that at each layer in the network stack there are layer-relevant attack vulnerabilities, and well designed network defenses have defensive elements at each layer. The defenses at each higher layer are designed, in part, to protect against the vulnerabilities of the lower layer(s). Most of the innovation in firewall design over the past 15 years has essentially been to move the analysis of layer n traffic up one level, so as to capture and analyze multiple pieces of layer n traffic, in order to assemble a more complete understanding of whether a set of layer n traffic segments corresponds to an attack using that layer.

As the defenses are gradually moved up the network stack, they must have a greater understanding of the semantics of the protected layer. To take this to its logical conclusion, since the top layer is the application, the outcome of this historical progression will be defenses that know how to protect applications; by understanding the normal state and behavior (i.e. network access, file access, disk access and on-disk presence, and memory access) in and out of the protected applications.

Malware that knows how to propagate itself falls generally into 2 behavior categories, though often malware that can do one, can also do the other. The first is inter-system propagation, such as through email systems, and the second is on-system propagation, such as copying itself into many files on a hard drive.

Roughly speaking, there are 3 kinds of anti-virus (A-V) mechanisms: network filters, file system scanners, and monitors. The network filter has an architecture roughly similar to that of the firewall architecture covered above, since it has the same goal of filtering out penetration attempts; it provides a defense against inter-system propagation The file system scanner looks for on-system viruses in all file accesses (and can be used to sieve through file sets to look for viruses, perhaps comparing against a 'signature' database, i.e., an exhaustive set of defined attributes of known virus and similar malware), while the monitor attempts to detect and block on-system viruses from doing virus-like behavior such as loading itself into memory, infecting files and operating system disk blocks, etc.

The monitor portion of an A-V tool set has an interesting challenge—ideally it would attempt to determine whether any running software is doing any virus-like behavior, but new viruses are generally able to outwit most A-V software This vulnerability to successful infections from new viruses is part of the "Zero Day" risk, There have been well documented successful Zero Day attacks from all sorts of malware, including viruses; details are available on the Internet.

With respect to the current situation of PC security defenses, although the architectures described above are interesting from a system defense perspective, it is interesting to note that even with the latest system defenses, successful malware attacks and infections are on the rise, and that installing defensive software on an infected system will not eliminate the current infection.

New, and therefore unprotected, PCs are infected within a few minutes of being put on the net, and they have to be put on the net in order to download and install the latest security defense updates and operating system security-related patches. Moreover, any PC that has been offline for several weeks is similarly vulnerable, during the time period from when it is connected to the net until the latest operating system (O/S) patches, virus signatures, and firewall updates are installed and active.

In addition, even machines that are Constantly connected, with automatic download & updates, are at risk from so-called Zero Day attacks This is because it takes time for the security patches and updates to be created in response to new malware and newly discovered vulnerabilities, and all PCs on the net during this intervening period are vulnerable to these new malware attacks. And even later, when there are available' patches and updates, with automatically scheduled downloads & updates it often takes a few days for all at risk PCs to get the latest versions.

And to make this situation even more serious, there are new threats daily. Not almost daily, as it was Only a year or so ago, but with at least one new serious threat each day. Many experts expect this situation to become worse, with new malware attack threats coming even more frequently, perhaps hourly.

As a result, one can not depend on the current generation of network and PC defensive mechanisms to prevent the infection of PCs This situation puts at risk our data and other assets, and therefore our willingness to use the Internet.

In order to provide a secure computing environment, it is necessary to defeat malware propagation. This alone will not provide a secure computing environment, but it is a necessary element. Older security technologies are still necessary, but they are not sufficient to prevent system penetration (unauthorized access), which is why there are so many successful penetrations.

This is a significant problem. Successful penetration may leave no tracks or evidence, or a rootkit (i.e. trojan or backdoor program) may use active camouflage to prevent detection. And successful penetration leads to the installation of the virus, rootkit, or spyware, as well as to successful theft and/or damage to data.

Each day there are new attacks, new exploits, newly discovered vulnerabilities. It is thus probably impossible to prevent zero day (brand new) attacks from successful penetration of any network connected computer systems. Given the expectation that at any given moment a computer may be infected with some variety of malware, in order to protect the confidentiality and integrity of data, it is clear that something new is needed.

SUMMARY

It is therefore an objective of the present invention to provide an improved storage firewall architecture, method and system that works in parallel with existing security technologies and provides application software authentication, including, application registration, runtime authentication of application identity and permission to execute.

Another objective of the present invention is to provide an improved storage firewall architecture, method and system of the type described which provides user authentication & authorization in the execution of an application.

Still another objective of the present invention is to provide an improved storage firewall architecture of the type described which provides examination, verification, and authentication of all storage access requests.

Yet another objective of the present invention is to provide an improved storage firewall architecture, method and system of the type described which provides monitoring of protected storage to detect & repair anomalous changes.

A further objective of the present invention is to provide an improved storage firewall architecture, method and system of the type described which provides encryption of protected storage, both data and software.

A still further objective of the present invention is to provide an improved storage firewall architecture, method and system of the type described which provides provisioning (deployment) of patches, configuration changes, and software through a secure synchronization link to a configuration and patch management server.

An additional objective of the present invention is to provide an improved storage firewall architecture, method and system of the type described which provides server-based system administration & configuration to prevent malware from penetrating local configuration mechanisms.

Briefly, the present is directed to an improved storage firewall architecture, method and system that works in parallel with existing security technologies and, inter alia, provides application software authentication, user authentication & authorization in the execution of an application, examination, verification, and authentication of all storage access requests, monitoring of protected storage to detect & repair anomalous changes, encryption of protected storage, both data and software, provisioning (deployment) of patches, configuration changes, and software through a secure synchronization link to a configuration and patch management server, and server-based system administration & configuration to prevent malware from penetrating local configuration mechanisms.

A key advantage of the present invention is that it includes a mechanism which provides application software registration & runtime authentication. Only registered (authenticated) applications can access the protected storage area.

Another advantage of the of the present invention is that the control and support server (update server) provides off-machine services that enable a local storage unit to verify that it has not been compromised.

Still another advantage of the present invention is that interactions between an update server and a local storage firewall are necessary for software application support and maintenance.

The storage firewall in accordance with the present invention provides even stronger protection if implemented in hardware, perhaps as part of ASIC firmware because its instructions and data structures are not resident on the host (protected) computer, and are thus not accessible to malware on that computer.

A storage firewall ASIC in accordance with the present invention can be integrated directly into the control circuit of any type of storage device including a hard disk drive (HDD), be it of the rotating platters type or of flash memory.

Moreover, a storage firewall in accordance with the present invention can even be integrated into other memory and storage-related devices such as tape drives, RAM, etc., and will have value in any system architecture to provide protection of application software located adjacent to data used by that application.

Since the file system used within a storage unit in accordance with the present invention is different from the host PC's file system, the architecture of the storage unit can be considered an example of file system virtualization even though it is not part of a SAN storage resource pool, etc.

An additional advantage of the present invention is that the storage firewall can be integrated with biometric or RSA-style secure ID devices such as the thumb scan type Flash Drive devices that require a correct thumb to be identified in order to authenticate a user as authorized to use a device.

A storage firewall in accordance with the present invention can be used to filter or control access to any computer or digital storage, both long term storage such as disks, tapes, CD's, etc., and short term or temporary storage such as RAM (computer main memory). Furthermore, any digital (or analog) storage, on any digital (or analog) device, can be protected by a storage firewall, including PCs, cell phones, embedded systems, RFID chips, vending machines, space craft, war ships, servers, telephone fabric switching systems, etc.

Yet another advantage of the present invention is that a storage firewall in accordance therewith can be implemented in software, firmware or hardware.

These and other objects and advantages of the present invention will no doubt become apparent to those skilled in the art after a reading of the following detailed disclosure which makes reference to the several figures of the drawing.

IN THE DRAWINGS

FIG. 4 is a diagram illustrating interaction between the Firewall+ Storage Firewall and an Application stored in Protected Storage in accordance with the present invention;

DETAILED DESCRIPTION

Figure 1:
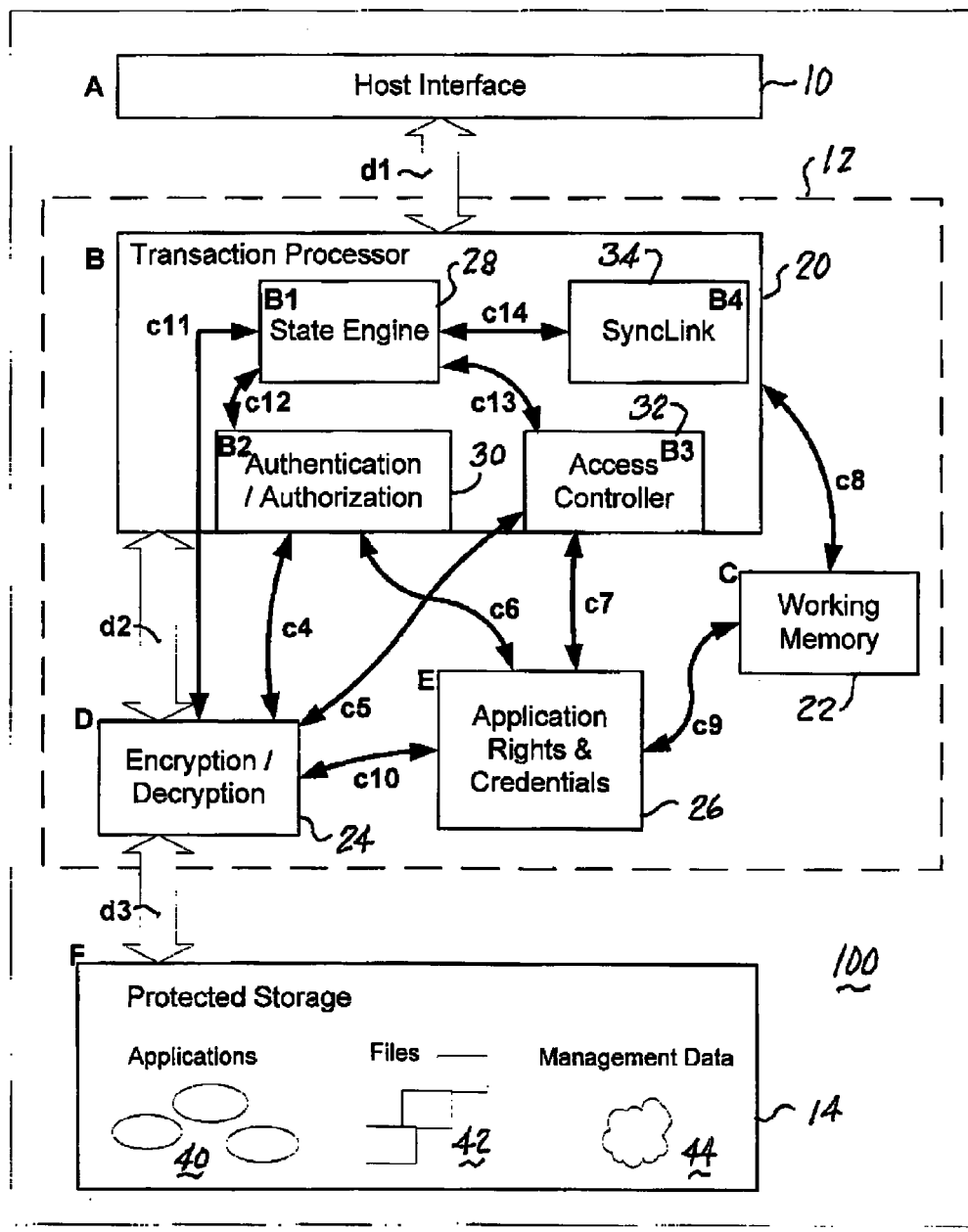
FIG. 1 is a block diagram illustrating an embodiment of a data storage device including a storage firewall in accordance with the present invention.

Referring now to FIG. 1 of the drawing, a data storage system in accordance with the present invention, and sometimes referred to herein as the Firewall+ storage firewall or the F+ storage firewall, is schematically illustrated in block diagram form at 100. As depicted, the system includes a host interface 10, a storage firewall 12 and a protected storage component 14.

The illustrated host interface 10 provides an interface between a host computer (not shown) and a storage firewall 12. The storage firewall 12 is composed of a transaction processor component 20, a working memory component 22, an encryption/decryption component 24, and an application rights & credentials component 26. The protected storage 14 is the memory that is being protected. The storage firewall 12 is connected to the host (not shown) through the interface 10 and sits between the interface 10 and the protected storage 14.

Transaction processor component 20 processes storage access requests and other requests related to the administration of the storage firewall 12, and includes a state engine module 28, an authentication/authorization module 30, an access controller module 32 and a SyncLink module 34.

Working memory component 22 provides local memory storage that persists across transactions. It is used for a variety of processing memory and storage purposes by the storage firewall.

The encryption/decryption component 24 provides encryption and decryption functionality for both storage firewall processing and encryption and decryption of data of authorized transactions. It also keeps track of the symmetric key needed for the encryption and decryption operations, and provides the command & control path to the protected storage 14 from the transaction processor component 20.

The application rights & credentials component 26 stores, processes, and provides user and application credentials and access parameters for authentication, authorization, and access control purposes.

State engine module 28 provides for execution of the transaction decision tree or state table of the storage firewall 20. All transactions are processed through the state engine module, which decides what to do, how to respond, and which other modules and components to use to meet the requirements of the requested transaction.

Authentication/authorization module 30 provides the authentication and authorization functionality of the storage firewall. This means that the authentication/authorization module examines the current credentials and identifying information of the requesting user and the requesting application, then decides whether to grant access to the protected storage. If granted, an authentication token is generated.

Access controller module 32 provides access control for an application that requests access to the protected storage 14. The requesting application must provide a valid authentication token. The access controller module validates and verifies this authentication token. If the authentication token is valid, the request is evaluated to decide whether to grant access, based on previously stored authorization parameters.

The SyncLink module 34 provides an intelligent communication channel to a remote management system's update server (not shown). As indicated above, the SyncLink module is part of the transaction processor 20. Although the storage firewall can operate as a stand alone storage unit and provide its security functionality without a SyncLink component, as will be discussed in detail below, a Firewall+ storage firewall without the SyncLink module 34 will not be integratable with a remote update server (not shown) in that it will not be able to obtain updates, such as changed and new application software.

The protected storage unit 14 is the memory that is being protected by the firewall 12 and may contain protected applications 40, protected files 42, and protected storage firewall management data 44. Applications are stored as files 42 and management data may also be stored as files. This is to say that the files 42 may include any digital information or object.

The double headed arrow d1 represents the data and request signal path between the host Interface 10 and the transaction processor component 20 in firewall 12. It is also used as a path into and through the host Interface 10 (and host computer's Internet connection) to poll a remote management system update server (not shown) for updates.

The double headed arrow d2 is the data path between the transaction processor component 20 and the encryption/decryption component of the firewall 12. Data moving on the path d2 has not been encrypted by the encryption/decryption component.

Double headed arrow d3 is the data path between the encryption/decryption component 24 and the protected storage 14. Data on the path d3 has been encrypted by the encryption/decryption component 24.

The arrow c4 is the control connection and data path between the authentication/authorization module 30 and the encryption/decryption component 24 and carries commands to encrypt and un-encrypt (clear) data to the encryption/decryption component 24. c4 also carries encrypted data back to the authentication/authorization module 30. In addition, c4 also carries commands to decrypt and encrypt data to the encryption/decryption component 24, and carries decrypted data back to the authentication/authorization module 30.

Arrow c5 is the control connection and data path between the access controller module 32 and the encryption/decryption component 24. c5 carries commands to encrypt and un-encrypt (clear) data to the encryption/decryption component 24, and carries encrypted data back to the access controller module 32. c5 also carries commands to decrypt and encrypt data to the encryption/decryption component 24, and carries decrypted data back to the access controller module 32.

The arrow c6 is the control connection and data path between the authentication/authorization module 30 and the application rights & credentials component 26. c6 carries user and application credentials and access parameters for authentication and authorization processing; and also carries authentication tokens that represent granted permissions for access requests.

c7 is the control connection and data path between the access controller module 32 and the application rights & credentials component 26 and carries access parameters and authentication tokens for authorization and access control processing. c7 also carries granted permissions for access requests.

Arrow c8 is the control connection and data path between the transaction processor component 20 and the working memory component 22. It carries a wide range of data in support of storage firewall processing.

c9 is the control connection and data path between the application rights & credentials component 26 and the working memory component 22. It carries data in support of authentication, authorization, access control, application and user rights and credentials processing.

Arrow c10 is the control connection and data path between the application rights & credentials component 26 and the encryption/decryption component 24. c10 carries commands to encrypt and un-encrypt (clear) data to the encryption/decryption component 24, and carries encrypted data back to the application rights & credentials component. c10 also carries commands to decrypt and encrypt data to the encryption/decryption component 24, and carries decrypted data back to the application rights & credentials component 26.

c11 is the control connection between the state engine module 28 and the encryption/decryption component 24 as well as control signals from the state engine module 28 to the protected storage 14 by passing them to the encryption/decryption component 24, which in turn passes them through to the protected storage 14.

Arrow c12 is the control connection and data path between the state engine module 28 and the authentication/authorization module 30.

Arrow c13 is the control connection and data path between the state engine module 28 and the access controller module 32.

And finally, arrow c14 is the control connection and data path between the state engine module 28 and SyncLink module 34.

The illustrated storage unit undergoes several phases of operation:

a). Quiescent Phase (Pre-Startup, Not Running)

When the device is in its Quiescent Phase, the protected storage is not reachable, i.e. it can not be written to, nor can it be read from.

b). Startup Phase

When the storage device starts running, it is in its Startup Phase. In the startup phase the device becomes ready to handle local transactions. But the storage firewall 12 will not grant access to the protected storage 14 until there are valid credentials received and stored by the application rights & credentials component 26. It is required that these valid credentials be successfully provided before storage access transactions can be granted.

c). Active Phase

The Active Phase begins when the storage firewall 12 begins to grant access to the protected storage 14. During the active phase, the storage firewall 12 requests updates from an update manager (not shown) if a secure connection can be established.

d). Shutdown Phase

The Shutdown Phase begins when the storage firewall 12 stops granting access to the protected storage 14, and performs cleanup operations such as deleting obsolete credentials from the application rights & credentials component 26. This phase is not necessary to the successful subsequent operation of the storage device. If the shutdown phase cleanup is not performed, then these actions might be performed on the next startup of the storage device.

Implementation

As pointed out above, the transaction processor component 20 has three subsystems. The implementation of the transaction processor component involves the integration of three subsystems; i.e., the state engine module 28, the authentication/authorization module 30, and the access controller module 32. As will be further described below, the SyncLink module 34 is also included for enabling communication with a remote server.

The state engine module 28 is the transactional portion of transaction processor 20, and is based on a software coded state table, an implementation of the storage firewall decision tree. To save space on the chip, the decision tree is encoded in a state table. The state table has an entry for every transaction conducted by the storage firewall unit.

There is also one or more no-op transactions provided as catch-alls for received transactions that do not match any of the supported transactions. This no-op transaction ability is an important security measure, responding to attempts to map the transaction set provided by the specific storage firewall being attacked. The no-ops in the storage firewall's transaction processor component's state engine module may or may not provide deliberately erroneous results (obfuscation) to the attacker, or may ignore the request; this ambiguity is part of the defense mechanism.

If the chip is implemented as an FPGA (Field Programmable Gate Array) or other field-changeable chip or chip portion, it may be possible to upgrade or replace the state table in an operational storage firewall's transaction processor component's state engine module. This is useful to add transactions, or to improve or change the behavior of existing transactions. It can also be a security vulnerability, if an attacker is able to change transaction behavior. This implementation is preferred in some consumer products, to reduce product support costs.

If the chip is an ASIC (Application-Specific Integrated Circuit) or other non-field-changeable chip or chip portion, then it is not possible to upgrade or replace the state table in the field. This implementation is preferred in a highly secure product or installation, such as a military application.

The state engine module uses the authentication/authorization module to evaluate (verify and validate) input application-signatures, user input credentials, and other authentication and authorization inputs. If an authentication token is generated as part of the initiation request transaction processing, it is provided to the application through the host interface.

The state engine module 28 uses the access controller module 32 to evaluate (verify and validate) input authentication tokens. Inputs to the state engine module are provided by the host interface 10. These inputs are part of transaction requests. If the inputs are valid, and the internal state permits, the requests are granted.

For granted (authorized) read transactions, the state engine module directs the encryption/decryption component 24 and the protected storage component 14 to provide and decrypt the requested data. The data is provided to the application through the host interface.

For granted (authorized) write transactions, the state engine module directs the encryption/decryption component and the protected storage component to accept and encrypt the provided data. The data is provided to the storage firewall from the host interface.

User authentication and application authentication are implemented differently. As used herein, the term authentication refers to both authentication and authorization.

The authentication/authorization module 30 is controlled by the state engine module 28. Identification credentials of the current user are used to authenticate this user. The provided user credentials are validated by the authentication/authorization module. The implementation is to use the application rights & credentials component 26 and the encryption/decryption component to compare the provided user credentials against those stored previously.

Access to the protected storage 14 is granted only if the provided user credentials are successfully validated. The result determines whether the current user will be permitted to access the protected storage. The application rights & credentials component 26 indicates whether or not the provided user credentials are validated.

The authentication/authorization module 30 uses the application rights & credentials component 26 to keep track of whether valid user credentials have been provided by the user since the storage firewall started running. A fresh user authentication must take place each time the storage firewall starts running.

The authentication/authorization module also uses the application rights & credentials to store, process, and retrieve the user's authorization rights. When an application wants to access the protected storage, it must request initiation of a storage firewall transaction session. The application provides an application-signature with the initiation request.

The authentication/authorization module 30 uses the application rights & credentials component 26 and the encryption/decryption component 24 to attempt to validate the application-signature. If the application-signature is valid, and the current user credentials are valid, then the application rights & credentials component is used to generate an authentication token. The authentication/authorization module provides the authentication token to the state engine module 28.

The access controller module 32 is controlled by the state engine module 28. Each access request by an application must have a valid authentication token (other than the initiation transaction). The access controller uses the authentication token provided by the application to evaluate whether to permit the current transaction request.

The access controller module 32 uses the application rights & credentials component 26 to validate the authentication token, and to retrieve the application's rights. For a valid authentication token, the application rights govern whether to approve the request.

The SyncLink module 34 is controlled by the state engine 28. Periodically, the state engine uses the SyncLink module to poll the update server (not shown) of a remote management system (not shown) for updates. When an update is received, the SyncLink module opens up the retrieved update package, and provides the contents of the update package to the state engine for processing.

In the illustrated embodiment the working memory component 22 is implemented as solid state memory.

The encryption/decryption component 24 is implemented using the encryption algorithm AES (Advanced Encryption Standard); a US government encryption standard, which is a version of the Rijndael block cipher. It is documented by the US National Institute of Standards and Technology (NIST) as U.S. FIPS PUB 197. The encryption/decryption component provides encryption and decryption operations that can be used by other storage firewall components and modules. It also encrypts and decrypts data as it moves into and out of the protected storage component.

The application rights & credentials component 26 is implemented as a set of data structures and operations that act on these data structures. It uses the working memory component 22 to store the data structures. The data structures include an application rights table, a credentials table, and user registration data (which are further described below). The component 26 provides operations that validate provided values against stored values.

When validating user registration data, the validation method for the user id is to compare the provided user id against the stored user id, byte for byte. The validation method for the password is to create an encrypted hash of the provided password, then to compare this against the stored password, byte for byte.

When validating an application-signature, the validation method is to create an encrypted hash of the provided application-signature, then to verify that this matches the corresponding value stored in the application rights table for the application that submitted it with the current initiation request.

When validating an authentication token, the validation method is to create an encrypted hash of the provided authentication token, then to use this encrypted hash to verify that the provided authentication token is current, refers to an active entry in the credentials table, and was assigned to the application that submitted it with the current request.

In this embodiment the protected storage component 14 is implemented as NAND flash chips.

Explanation of Operations

Major transactions are described below in relation to the functional diagram.

These transactions are:

Initiation;

Open file for read; and

Request and receive update for application.

All transactions come to the transaction processor component 20 via the host Interface 10, and all transaction results are returned (sent back) through the host Interface. The portion of the transaction processor component 20 that actually handles all transactions is the state engine module 28. This module provides all transaction command and control, using other storage firewall elements as needed.

Transaction: Initiation

The application sends an initiation request transaction to the storage firewall through the host Interface 10 to the transaction processor component 20, or in actuality, to the state engine module 28. The state engine uses the authentication/authorization module 30 to validate the transaction parameter application-signature, and to provide an authentication token.

The authentication/authorization module 30 uses the application rights & credentials component 26 to validate the application-signature against values stored in the application rights table, to verify that the current user is properly logged in to the storage firewall, to add an entry into the credentials table, and to generate the authentication token.

The application rights & credentials component 26 uses the encryption/decryption component 24 to hash and encrypt the authentication token, to store a hashed & encrypted copy in the appropriate entry of the credentials table.

Transaction: File_Open_Read

In this transaction, the application sends an open file for read (File_Open_Read) request to the storage firewall which passes through the host Interface 10 to the transaction processor, or in actuality, to the state engine module 28. The state engine uses the access controller module 32 to validate the authentication token, and to provide the application rights. The access controller module 32 uses the application rights & credentials component 26 to validate the authentication token, and to provide the application rights.

The application rights & credentials component 26 uses the encryption/decryption component 24 to hash and encrypt the input authentication token, for comparison against a copy stored in the appropriate entry of the credentials table.

If the application is authorized to open that file, then the state engine module 28 adds an entry to the File Table, and generates a file reference.

If the file has to be created, then the state engine module creates the file through the encryption/decryption component 24. The state engine module then returns the file reference to the application through the host Interface 10.

Transaction: Request and Receive Update for Application

As previously indicated, the state Engine 28 uses the SyncLink module 34 to poll a remote management system's update server for updates by sending an Internet update poll request packet to the remote update server. In response, the update server sends an update package to the local host computer.

The state engine module 28 uses the encryption/decryption component 24 to validate the retrieved update package by cryptographic means. The state engine uses the SyncLink module to open the retrieved update package, and provide the contents of the update package to the state engine module for processing.

The package may, for example, contain a software application and associated application rights and credentials data; if so, then the state engine uses the encryption/decryption component to encrypt the application and install it into the protected storage 14, and the state engine uses the authentication/authorization module, which uses the application rights & credentials component 26, to install the associated application rights and credentials data into the corresponding data structures.

Figure 2:
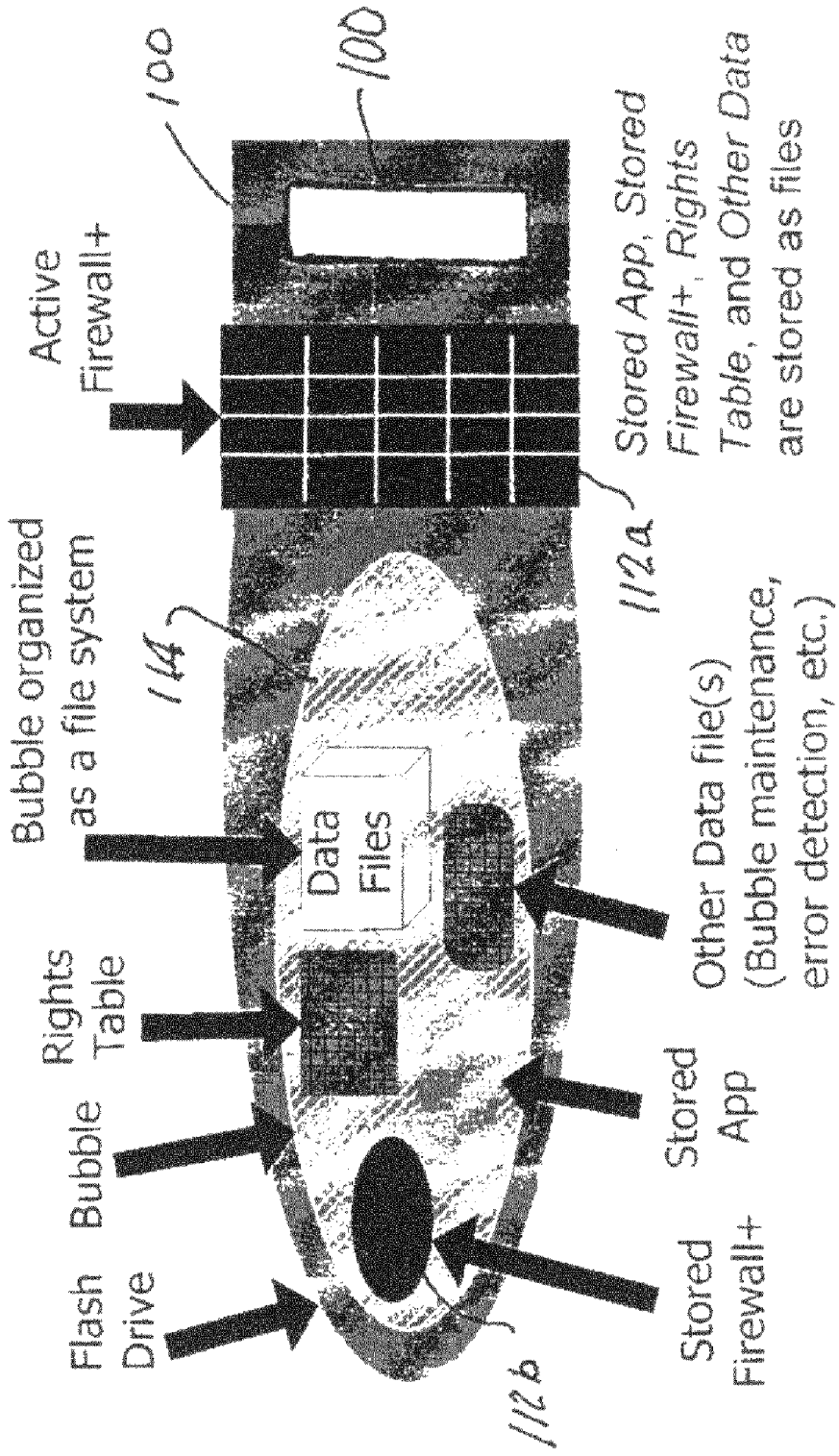
FIG. 2 is a diagram schematically illustrating an exemplary embodiment of a storage device implemented in a USB flash drive in accordance with the present invention.

FIG. 2 is an artistic or conceptual diagram schematically illustrating at 100 an exemplary embodiment of a storage device implemented in a USB flash drive in accordance with the present invention. In this diagram a host interface is shown at 110. The host interface 110 is a USB controller. USB controller chips and designs are commercially available from manufacturers such as Cypress, Anchorchips, Scanlogic, and Intel.

The active Firewall+ Storage Firewall is shown at 112*a*, and the storage component is shown as a Bubble at 114. If the implementation of the Firewall+ is in "software" such that the Firewall+ Storage Firewall executable is stored within the Bubble (as shown at 112*b*), the Firewall+ execution may be as a process executed on the host computer, rather than in the USB flash drive.

In most cases, Bubble contents will be organized in a Bubble-internal file system. This includes error detecting data, error correcting data, application rights table, Bubble maintenance data, and self-referential hash values. All of these are referred to as error correcting data. Since even the Bubble's own maintenance data is stored in a Bubble-internal file, the Bubble access operations are easier to implement, maintain, and test.

On the other hand, if the Firewall+ Storage Firewall is implemented on a chip (a "hardware" implementation) in the USB flash drive, then the "Stored Firewall+" 112*b* may not be present inside the Bubble.

Other possible implementations may put the Firewall+ on other hardware, such as the host computer's main board or storage controller. In these implementations, the Firewall+ may be conceptually portrayed as part of the host computer rather than a part of the USB flash drive.

Also, the same design may be used for storage devices and media other than USB flash drives.

As will be understood from the above more generalized description, the storage firewall unit has several inter-operating parts. The focus of this discussion is on aspects of the design that permit construction (implementation) of various embodiments. As previously suggested, there will be multiple different implementations and embodiments of this design to suit various applications. Moreover, there will be permutations required by the architectures of the products and technology (hardware and systems) being augmented by the Firewall+ functionality, and by the market requirements of the resulting improved products. However, these embodiments will all share the design philosophies, elements, and the architecture described herein.

This description will include various components and elements of the embodiments, both inside the Bubble and in the Firewall+ storage firewall, then describe the Firewall+ storage firewall in action. It is to be understood however that all transactions will not be covered since the focus is on those transactions that demonstrate the design of the present invention.

The authentication and authorization architecture will also be discussed since authentication, authorization, and access control (AAA) are key elements to any security-enabled system; Firewall+ is no exception. There will no doubt be some repetition of material covered earlier, but in general, this section goes into greater depth, focusing on the default algorithms. It will be appreciated that the AAA module can be replaced by a third party solution (and may well be for some implementations), but the default methods should be adequate for most purposes.

An overview of the principle transactions will also be discussed as implemented in a "state table"—the design does not require that every implementation use a state table for its transaction decision tree, but the documented state table is useful as a summary of important transactions. As in the above, not all transactions are covered in this table.

In most cases, Bubble contents will be organized in a Bubble-internal file system. This includes error detecting data, error correcting data, application rights table, Bubble maintenance data, and self-referential hash values. All of these are referred to as error correcting data. Since even the Bubble's own maintenance data is stored in a Bubble-internal file, the Bubble access operations are easier to implement, maintain, and test.

The following terms will be used in this discussion. If a term is used that is missing from this "glossary", it is expected to have the meaning assigned elsewhere herein, or if not specifically defined herein, it should be considered to have the meaning provided by a standard published authoritative technical dictionary.

| | Glossary |
|---|---|
| Application | Application software that intends to access a "Bubble". This might be non-application software such as host system software. |
| Bubble | Protected storage. This might be a single partition, a set of volumes, or any other defined storage area. |
| Firewall+ | The Firewall+ Storage Firewall executable and process. In some cases this is referred to as the F+ int or Firewall+ int (int for internal) because in some implementations the executable will be stored within the Bubble when not active. But other implementations of the Firewall+ will be on an ASIC, or FPGA, not stored within the Bubble. The Firewall+ term may also sometimes be used to refer to the entire Firewall+ architecture. |
| Firewall+ Startup-Diagnostics (FSD) | In some implementations, the FSD executable will be executed before the Firewall+ storage firewall executable is activated; it verifies the health of the Bubble and Firewall+ executable, repairing damage, or attempting to repair damage, if found. In some cases this is referred to as the F+ ext or Firewall+ ext (ext for external) because its executable is never found within the Bubble. |
| Registration | Firewall+ operation that adds applications to the Rights table; part of provisioning |
| Rights table | Persistent data structure that contains application rights and credentials for registered applications. In some cases this is referred to as the registration table or registry. |
| Initiation | Handshake transaction when an application starts running, informing the Firewall+ that the application will start sending access requests. |
| Authentication | Part of the Initiation transaction: when an application starts to run, it must first prove it is the corresponding application, among those in the Rights table, thereby proving that it has rights to access the Bubble. This proof is provided by a cryptographic operation involving the application supplied application-signature. |

-continued

| | Glossary |
|---|---|
| Authorization | Part of the Initiation transaction: when an application starts to run, the rights are examined, a credentials entry is made, and an authentication token is generated. The authentication token links to the entry in the credentials table, which provides a link back to the rights table. |
| Access control authorization | The authentication token is provided back to the Firewall+ Storage Firewall with every subsequent access request. The authentication token is cryptographically validated on every use, and then used to validate access permissions for the requesting application. |

Application Rights Table (aka Rights Table, Registration Table)

Figure 3:
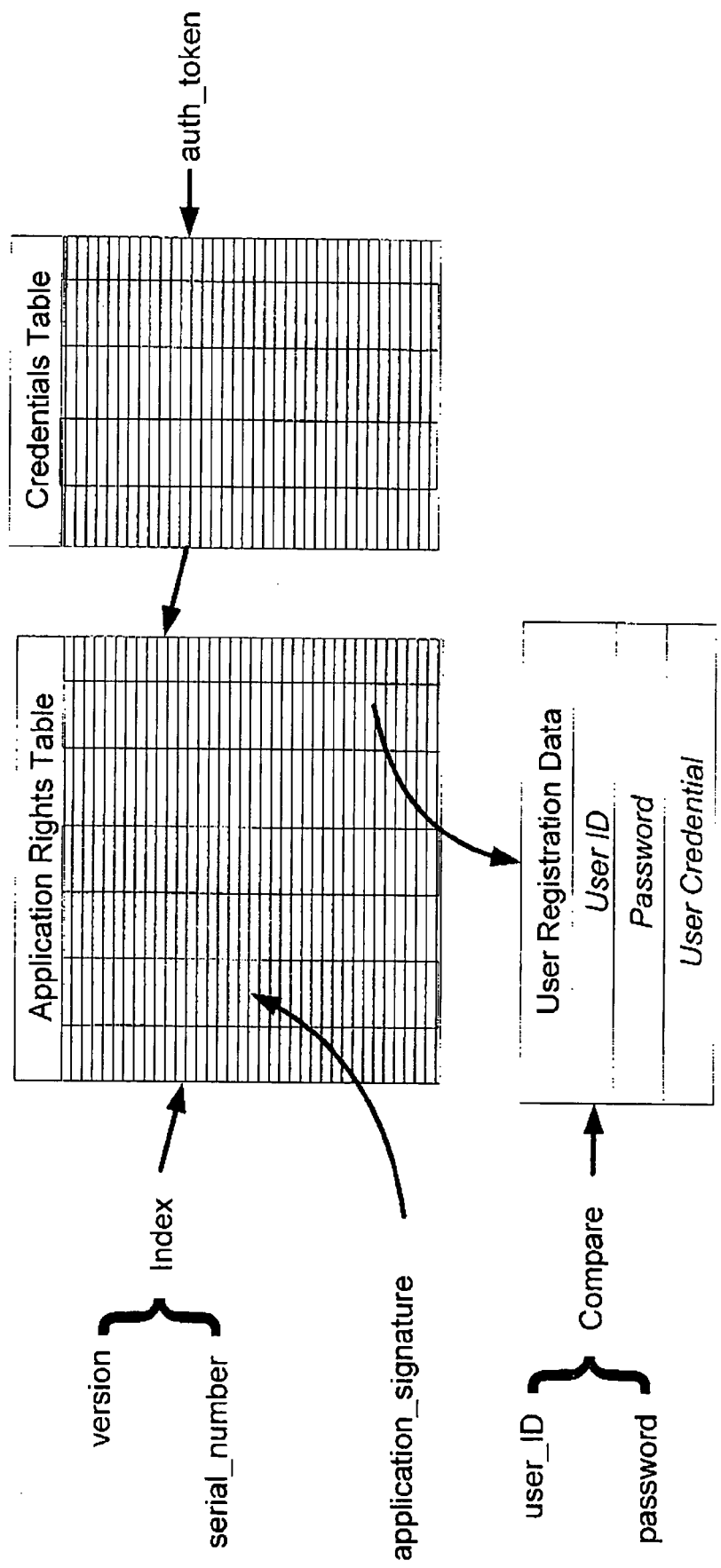
FIG. 3 is a diagram illustrating Authentication Data Structures in accordance with the present invention.

An application rights table is illustrated in FIG. 3 and is used to register deployed applications when provisioned (deployed or installed) to the Firewall+ storage firewall protected storage or device. If there are no applications within the Bubble, the application rights table does not have to exist—it is created when the first application is provisioned. It does not have to be destroyed when (or if) all applications are deleted from the Bubble.

In general, the application rights table keeps track of the presence of provisioned application software and the rights software applications have to access the Bubble. Software does not have to be installed within a Bubble to have rights to access that Bubble, but generally installation within a Bubble confers associated access rights.

The application rights table is a key data structure. It will grow as applications are added to the Bubble. It can be indexed by the application identity (a hash of the application's version and serial_number) as well as by a generated authentication token (described below).

Key elements of the application rights table include data fields for:
- version—version of the currently provisioned application, used for several purposes such as optional replacement if application is damaged or lost, as well as update and patch. May be linked to a general update behavior, on the update server.
- serial_number—string identifying the currently provisioned application, generally keyed to a specific license stored on the update sever. It is used for several purposes such as replacement if application is damaged or lost, as well as update and patch.
- authentication—flag if this application is permitted Bubble access, plus other data used in the application authentication operation
- authorization—optional Bubble access permissions, other optional authorization data The concatenation of version and serial_number is guaranteed to be a unique value across all possible supported applications. A hash of the version and serial_number may be used as an index to the Rights table.

Directory Structure

The Bubble has its own file system—independent of the file system of the host computer. A POSIX compliant approach may be used in this file system. It has a hierarchical structure, not very different from the Unix directory structure, using files to store directory information, and representing files by file names, linked to file inodes. The inodes can then be used as unique file (and directory) identifiers in the File Table.

Minimal Bubble

The minimal contents of the Bubble is a Bubble empty of any application data, but with error correcting data in one or more files. The minimal Bubble will contain an empty Rights table.

The error correcting data can be used to verify the health of the Firewall+ storage firewall executable. It can also be used to validate the empty state, when the Firewall+ storage firewall responds to a query that would otherwise return Bubble contents or Bubble state.

Bubble with Data Files Only

The Bubble either has contents or does not have contents. If it has contents, the simplest case is externally referenced data plus the contents of the minimal Bubble. The externally referenced data is organized as one or more files in the Bubble-internal file system. There is error-correcting data kept, in separate storage, for each data file.

To create a Bubble-internal file, the external software (typically a software application) sends a file creation access request to the Firewall+ storage firewall. This request provides an externally referenced file name. This name maps to a Bubble-internal file reference, such that later access queries will map to the correct file. The Bubble-internal file reference is very similar to a Unix-style inode.

With One or More Applications and Associated Data

When applications are kept within the Bubble, they are stored and treated like data files, in the manner described above.

The method employed by the user to start executing a Bubble-resident application depends on the implementation of the Firewall+ storage firewall, on its context of use.

In a 'preferred embodiment', after the Firewall+ storage firewall finishes its startup operation, it will kick off a default application, an application-browser. This will permit the user to select an application from a list or menu.

In this embodiment, the application-browser will always be present in every Bubble, so they would never be completely empty. This has implications for the Rights table, etc.

Firewall+ Storage Firewall Data Structures

File Table (for Open Files)

The File Table is not a permanent structure—it is transient, created and expanded as needed.

The Firewall+ uses the File table to keep track of which files applications have open. There may be all of the expected file operations; e.g. files can be created, opened for reading or writing, closed, deleted, etc. The File Table can be cached within the Bubble or kept in transient memory (RAM), or some combination of these.

The File Table is indexed by a file reference value, or a value derived from the file reference value. (In some cases, the file reference value may be referred to as a file pointer or fp.) The file reference is passed to the application when a file is successfully opened, and is passed from the application to the Firewall+ storage firewall with every successive file operation on that open file, until it is closed.

An application may have more than one file open. For each open file there is a different file reference value.

In some other file systems it is possible for more than one application to have write access to the same file, but in this design only one application may have write access to a file at a time. Multiple applications may have simultaneous read access to a file. The way the File Table keeps track is discussed below.

The File Table keeps track of which application(s) currently have authorization (permission) to access a file, a subset of the applications that currently have permission to access the Bubble.

The File Table also keeps track of which applications have opened a file for access. Because multiple applications may have read access to a file, plus another application may have write access, it is necessary for the File Table to have an expandable structure to store references to these applications.

The authentication token is described below, but a brief mention of how the authentication token relates to the File Table is useful. Each application that is granted access to the Bubble has a unique auth_token. This authentication token is used for several purposes related to access control, but it can also be used to refer back to the corresponding application. The File Table's mechanism for tracking which applications have active file references to a file uses the applications' authentication tokens (auth_tokens) as reverse references to the applications. In case there is a need to look up application access privileges or other attributes, the tracked authentication token can be used.

There is a limit to the number of files that can be open at any one time: If the Bubble is full, and Firewall+ storage firewall's working memory is full, then additional files can not be opened, because there is no space to expand the File Table. One workaround is to reserve a portion of the Bubble for File Table expansion, but this does not eliminate the issue—there is still a limit to the number of files that can be opened at any one time. This limit depends on several variable factors, so it is not a hard number. Of course, if the Bubble were full, there would be no place to put a newly created file, so File Table expansion would be irrelevant in that case.

Authentication Token

The authentication token is provided to applications when they open contact with the Firewall+ storage firewall (the Initiation transaction)—IFF they are authenticated and authorized for Bubble access. The authentication token is used to index the Credentials table to verify application rights (privileges) for an operation such as opening a file. As such it is passed to the Firewall+ storage firewall with every application file access transaction.

For the detail minded, the authentication token, auth_token, is a hash of validating data and an index to the appropriate entry in the Credentials table.

Credentials Table

The Credentials table also shown in FIG. 3 is transient, created as needed by the Firewall+ storage firewall, generally as part of the reaction to an initiation transaction request.

The Credentials table stores a version of application authentication, authorization, and access credentials and rights. It is indexed by the authentication token. It contains an index into the Rights table for the corresponding application.

The Firewall+ Storage Firewall in Action

This portion of the disclosure is organized by transaction types, where for each there is roughly the same organization of information. The transaction types covered are:

Deployment (provisioning) and registration of the application into the Rights table.

Firewall+ startup, a sort of self-transaction, which might also kick start an application.

Firewall+ initiation (handshake) transaction when the application starts running.

Application access, with a focus on read/write requests.

For each of these, there are generally four parts:
- Request/response protocol, even though the application shouldn't see most of these, as they'll be hidden within the ABI
- Possible code changes to the application
- Changes to the Rights table
- Other components used and/or changed, if any Overview of Application to Storage Firewall Interaction This is an overview of the interaction between applications and the Firewall+ storage firewall, using as an example a sample set of transactions that include opening a Bubble-protected file for reading, and making a read request from that file. It provides context for the following sections.

With reference to FIG. 4 note that: the Firewall+ API initiation request is in the application's startup code; the application is linked to the Firewall+ ABI, and the application is registered in the Firewall+Rights table.

Steps in the file access interaction. Each pair of steps (such as steps 3 & 4) is a complete request/response transaction.

1. App starts to run, and initiates contact with the Firewall+ storage firewall.

2. Firewall+ authenticates the App, and provides authorization credential (auth_token), which the Firewall+ ABI keeps track of.

3. The App sends 'open for read' file access request to F+, where the authentication token is added to the file open request by the F+ ABI 4. Firewall+ optionally logs the access request, then verifies the App's auth_token, opens the file for read, then returns a file reference—an index into the File Table 5. The App sends a read access request to Firewall+, where the authentication token is added to the file read request by the Firewall+ ABI, and the file pointer (fp) is a Firewall+ file reference, an index into the File Table.

6. Firewall+ optionally logs the access request, then verifies the App's auth_token, reads requested data from file, updates entry in the File Table indicating current position in the file, then returns the requested data to the App.

The Firewall+ ABI

The Firewall+ ABI hides the transaction details from the application. Application software that has been modified to work with the Firewall+ storage firewall will have been linked against the Firewall+ ABI, and have a small addition to its startup routine.

The Firewall+ ABI replaces the file operation library that the application was previously linked to. The Firewall+ ABI provides a file access operations set that has the same semantics and syntax, but that knows how to negotiate access with the Firewall+ storage firewall. There is an include (header) file set that matches the Firewall+ ABI.

The purpose of the Firewall+ ABI software is to provide file access operations, plus to negotiate with the Firewall+ storage firewall. This includes initiating interaction with one or more currently running Firewall+ storage firewalls, and authenticating the right of this application to access the protected storage; this is provided by the Firewall+ initiation transaction. The Firewall+ initiation transaction is performed by a function call, added to the application's startup code.

It is possible that more than one Firewall+ storage firewall may be running at the same time, and it is possible that an application may be separately authenticated to access multiple of the protected storage areas.

There will be a unique authentication token (referred to as auth_token) provided for each application—to—Firewall+ execution instance, passed to the application by a successful Firewall+ initiation transaction. The authentication token must be passed back to the Firewall+ storage firewall for every subsequent file access transaction. The Firewall+ ABI adds the authentication token to the file access requests on behalf of the application.

Application Provisioning (Deployment, Registration into the Rights Table)

A relevant transaction occurs when an application is provisioned to the protected storage.

Before dealing with this transaction, the definitions of several terms will be resolved: provisioning, deployment, and registration. In particular, there may be some confusion over the difference between provisioning and deployment. In the Firewall+ architecture, these terms may include the following meanings:
- Provisioning provides the functionality, whereas
- Deployment delivers and installs the mechanism (such as the application software)

In the Firewall+ design, the successful installation of application software to a Firewall+ Bubble has these steps:
- Deployment of the application software
- Registration of the application into the Rights table From the perspective of the local Firewall+ storage firewall, the deployment and registration steps constitute the provisioning transaction. To repeat, provisioning requires deployment then registration.

The SyncLink description (provided elsewhere) provides an overview of the normal provisioning process. In brief:

1. The Firewall+ storage firewall requests an update from the update server.

2. The update contains instructions, including that the Firewall+ should request an application 3. The Firewall+ requests & receives the application package 4. The Firewall+ installs the application package 5. The Firewall+ registers the application software To repeat, provisioning the functionality provided by the application software requires deployment of the software, followed by registration into the application Rights table.

When new application software is deployed, the Firewall+ receives verification and authentication data with the downloaded package. This data is used to authenticate the received package. This is in addition to the authentication done during the SyncLink operation to authenticate each of the endpoints, the Firewall+ and update server, to each other. In addition, the package verification and authentication data is used to verify that the package has not been damaged or modified since leaving the update server. If the package can be successfully authenticated and verified, it may be deployed.

Software registration is part of the provisioning transaction. Registration modifies the application Rights table.

Registration is done after the Firewall+ storage firewall update manager verifies the installation. Following the instructions in the package, after deployment the Firewall+ adds into the rights table the application runtime authentication information (application-signature) provided inside the downloaded package.

Either at this same time, or at some previous time, the same application-signature is (or was) provided to the application, so at runtime it will be able to authenticate itself to the Firewall+. In addition, the particular application-signature may have a different nature for different applications. The result of this flexibility is that some applications may be provisioned on a wide scale with common application-signatures, others are provided with unique application-signatures before being packaged for deployment, while others are provided with application-signatures generated locally by the Firewall+ storage firewall. [This and other mass-customization of the applications can be done on a wide scale, with the complexity handled by the intelligence governing the update server.]

The intent of the ability to apply different authentication schemes (or permutations of the basic authentication scheme) to different software applications is:

to support contractual obligations to software authors,
to support user customization (at the user portal web site)

There are multiple types of application provisioning, with some differences in how the Firewall+ conducts the local transaction. The two most common are New software to be installed into the Bubble
Replacement of software currently installed in the Bubble A related transaction is the removal of currently installed application software. This is not part of the provisioning transaction, but is mentioned here for completeness.

When new application software is deployed to a Bubble, it is not available for use until it has been registered. At that point, a final step is required before it is provisioned for use. This final step is generally done during the registration process, but may be done separately, later. This step is to set the active flag in the appropriate entry in the Rights table.

The active flag can have several states, including fresh, active, inactive, and purge.

Newly deployed software is generally fresh before becoming active. When replaced, software generally becomes inactive as the replacement becomes active. The purge state indicates the software is about to be (or due to be) removed (deleted) from the Bubble and the Rights table. Therefore, it is possible for there to be as many as four extant versions of the same software model in the Bubble, but it is unlikely that there would be more than three. At no time will more than one version be flagged as active. In addition, only an active version of the software can be successfully authenticated to the Firewall+ storage firewall.

Firewall+ Startup

This section discloses the process whereby the Firewall+ Startup and Diagnostics (FSD) program transfers control to the Firewall+ storage firewall. In a software implementation, before the Firewall+ storage firewall starts running, the FSD program runs. This is also discussed elsewhere as part of the Firewall+ startup mechanism. This section provides an overview of the transfer of control from the FSD to the Firewall+ storage firewall.

The process by which the user authenticates himself (herself) to the FSD is covered in the authentication, authorization, and access control (AAA) section of this disclosure. It is a relevant topic because clearly the user has to authenticate at some point before the Firewall+ starts accepting application requests, and it does not happen during or after the FSD transfers control to the Firewall+ storage firewall.

The Firewall+ storage firewall can be implemented in several different ways. Chief among these is (1) as a software application with driver level hooks into the host operating system, and (2) as firmware within a storage controller. The transfer of control to the Firewall+ storage firewall is actually similar for both of these, but there are some differences, so a first option is discussed, then the differences with a second option are provided. Other options for implementation of the Firewall+ storage firewall have similar startup methods.

When the Firewall+ storage firewall is implemented as a software application with driver level hooks into the host operating system, the default startup process is:

The FSD does its startup and diagnostics actions, including examination of the Firewall+ storage firewall executable for evidence of damage or tampering. (This means that the FSD must have a way of opening the Bubble, since the Firewall+ storage firewall executable is within the Bubble.)

After validation, verification, and any repair, the FSD starts the Firewall+executable. The actual transfer of control is done by sending the Firewall+ a Control transaction, then getting a 'success' response that matches a sanity value expected from this deployment of the Firewall+ storage firewall.

However, before transferring control (i.e. before the Control transaction), the FSD sends the Firewall+ an authentication and health (Health) transaction. If the response is not one of Health, the Firewall+ executable is terminated and the backup Firewall+ executable is started.

Then the Health transaction is re-attempted. If it succeeds, the Control transaction is used, then the parent process (the FSD) can exit.

If the Health transaction to the backup Firewall+ executable fails, the FSD kills the Firewall+ executable, then attempts to repair first the primary, then the backup Firewall+ storage firewall executable, using error correction data stored in the Bubble. If the repair succeeds, the Firewall+ can be started, followed by the Health transaction.

If neither of the executables can be repaired, the FSD will inform the update server to obtain a fresh Firewall+ executable. If the attempt to replace the Firewall+ executable fails (perhaps because there is no current SyncLink to the update server), then the FSD exits with an error message to the user; the Firewall+ can not be used at this time.

This default behavior can be modified by either a system implementer or by configuration changes. These modifications can be made to a single Firewall+ or to some defined set of Firewall+ protected devices.

When the Firewall+ storage firewall is implemented as firmware within a storage controller, there is similar startup behavior, but with some differences.

One major difference is due to the assumption that firmware in the controller is less likely to become damaged by malware or other system problems, so is less likely to need to be repaired or replaced by the FSD. As a result, there will not be a backup for the firmware Firewall+. It also may be more difficult or even impossible for the FSD to download and replace an 'unhealthy' firmware Firewall+. For example, if the Firewall+ firmware is part of an ASIC, this is not field re-programmable. On the other hand, an FPGA may be field re-programmable.

Firewall+ Initiation (Handshake)

This operation initiates communication with one or more currently running Firewall+ storage firewalls. There will be different implementations on different platforms, but essentially this sets up an inter-process communication channel, according to the mechanism used on that host computer's operating system.

When an application sends an initiation (handshake) request to the Firewall+ storage firewall, the values stored in the application rights table (Rights table) determine whether that application will be permitted to access the protected storage (Bubble).

The initiation transaction request should be added to the application's startup code. If we assume the application is written in C or C++, and the inclusion of the header file Firewall+.h, the initiation transaction request would look something like this:

F+_initiate(application_signature, &auth_token);

where F+_initiate( ) is a function provided by the F+ API, and the application_signature is a set of cryptographic information that identifies and verifies the identity of the application executable. The application_signature was provided to the application at some previous time, perhaps by linking it in before it was provisioned. Other information on the application_signature and authentication token can be found in the section on authentication.

Request/response protocol, even though the application should not see most of these, as they will be hidden within the ABI There are no changes to the Rights table from this transaction, but this authentication request may be logged.

Application File Access

Open/Read

From the perspective of the typical application, the Firewall+ file-open and file-read transactions should seem to have the same syntax and semantics as the standard operations. The Firewall+ ABI handles the access control issues, adding the authentication token to each transaction.

There are no code changes to the application for read access to a Bubble-protected file, other than for the Firewall+ initiation.

Open/Write

From the perspective of the typical application, the Firewall+ file-open and file-write transactions have similar syntax, but there is a significant difference in the behavior: there can be only one application that has a given file open for write at any time. Some operating systems permit multiple applications to have the same file open for write; the Firewall+ storage firewall does not permit this.

The restriction against multiple writers can be eliminated by providing the same sort of inter-process communication (IPC) mechanisms and/or file locking as many operating systems. These were avoided to simplify the Firewall+, as well as to reduce its footprint (size), so it can fit into smaller devices, perhaps as part of an ASIC. This restriction is not likely to have much affect on most of the applications that will be encountered.

The Firewall+ ABI handles the access control issues, adding the authentication token to each transaction.

For many applications, there need not be code changes for write access to a Bubble-protected file, other than for the Firewall+ initiation. Of course, in practice, this depends on the application software design, etc.

Extensibility

Both the SyncLink and Firewall+ transaction models have been designed for maximum extensibility. This is an important quality of the Firewall+ architecture, no matter what implementation choices are made. Some of the extensibility options are:

Transactions can be added,
Scripts can be sent to the Firewall+ storage firewall for local execution,
Hidden application software can be selectively deployed
Firewall+ storage firewalls can be replaced by later versions Augmenting the System by Adding New Transactions An implementer can add a new transaction or transaction type very easily. An existing system of deployed & provisioned Firewall+ enabled devices can also be augmented, by adding the desired transaction infrastructure, then replacing the Firewall+ storage firewalls in the field through the update mechanism.

Firewall+Command Execution: Scripts

The update server may send to the local Firewall+ storage firewall arbitrary scripts to execute. The Firewall+ has the ability to execute these scripts. The scripts have the same high level of authentication that other SyncLink downloaded packages have, so the intent of these scripts is not questioned by the local Firewall+. These scripts are authenticated and verified in the same way as application packages, but are not added to the Rights table, because they are generally executed just once, soon after download or at a loosely scheduled time. This functionality is generally used for maintenance operations, but may be used for many other activities. I Scripts are generally transient, provisioned when needed. If a more permanent tool is needed, a system tool is deployed.

Examples of use are:
the cleanup (purge) of old versions of software littering the Bubble,
backup or restore operations
quality of service monitoring, usually after the authorized customer reports a problem
disabling a provisioned service after the license expires
tracking the location of a device that's been reported as stolen by the authenticated owner Hidden Software The update server can selectively deploy hidden applications to one or more Firewall+ storage firewall protected devices. This software is deployed & registered in the normal way, but will not be evident to the user. In the preferred embodiment, the application-browser will not normally show the user the hidden applications deployed to the Bubble, but the application-browser can be adjusted by the user through an application configuration mechanism.

A category (type) of hidden software is system software. Most hidden software is system software.

System software applications are generally for maintenance, security, system management, quality-of-service monitoring, or other background responsibilities. They can be (may be) deployed without being activated, so they will be in place if needed later.

Augmenting the System Through Field Replacement of Firewall+

The Firewall+ storage firewall can be field replaced in the same manner as any other deployed software. The new package is deployed, then provisioned. The next time the Firewall+ storage firewall is started, the latest version is used.

When a new version of any software is provided, the most recent (proven stable) older version remains. The earlier version is not deleted until some time later, when the update server sends an instruction to do so, generally when there are two older versions in the local space.

If the newly provisioned version of the Firewall+ storage firewall won't start properly, the Firewall+ Startup and Diagnostics program will automatically kill the latest and start the earlier (proven stable) version.

Status information is automatically provided to the update server from the local Firewall+ storage firewall on each update request.

The Firewall+ Storage Firewall as Server

The Firewall+ Storage Firewall and update manager system has been designed to be extensible, as described elsewhere in this document. A related design goal is to use this extensibility to selectively enable Firewall+ Storage Firewall protected devices as relay servers to other Firewall+ Storage Firewall protected devices. There are many benefits to this design, not covered in this document.

Peer-to-Peer (P2P) Communication

The secure communication channel between the Firewall+ Storage Firewall and it's designated update manager servers can be directed to other Firewall+ Storage Firewall protected devices, and the transaction set on those other devices can be augmented with update manager services. This effectively defines those other devices as servers. This scheme can be extended, so that every Firewall+ Storage Firewall is both a storage firewall for local protected storage, and an application and general purpose update manager for other (peer) Firewall+ Storage Firewall protected devices.

The same SyncLink authentication mechanism defined for Firewall+ and Update Server authentication can be used for P2P SyncLink endpoint authentication. In addition, each Firewall+ Storage Firewall SyncLink module will have a flexible list of Update Managers to query for designated updates. This list can contain peers acting as servers as well as update servers that are not peers.

In addition, the Firewall+ SyncLink module can use a discovery mechanism to search for Firewall+ update servers and relays. This is covered in more depth in the SyncLink design document.

Pervasive Computing Vision

The purpose of using Firewall+ Storage Firewall protected devices in a P2P collaborative network is to map around possible network server outages, reduce Update Server bandwidth and server CPU congestion, and in general to provide a faster, more reliable, and better user experience.

Another use of the P2P nature of SyncLink communication and the application server nature of Firewall+ Storage Firewall enabled devices is that applications on multiple such devices can collaborate on tasks. In addition, applications can move between such devices, obtain more compute resources as needed, and do other collaborative actions in the pursuit of their goals. More on this aspect of the Firewall+ architecture in the application notes document.

Firewall+ Storage Firewall as Application Server to Local Host

The Firewall+ Storage Firewall, even if not in a P2P collaborative, essentially functions as an application and storage server to the local host. This is because of the transactional nature of Firewall+ Storage Firewall storage protective protocol. This differs from the typical local (i.e. direct attached) storage protocol which are often queue based, designed to minimize CPU involvement and cycle cost.

Authentication, Authorization, and Access Control

The term Authentication, Authorization, and Access Control is usually abbreviated as AAA. Some definitions of AAA use accounting instead of access control—in the Firewall+ design it is access control.

There is some transaction specific detailed information on AAA provided in the Firewall+ transaction sections—this part of this document provides an overview of the authentication architecture, plus additional details. If there seems to be a contradiction in the details, this AAA section is correct on the AAA approach, architecture, and general mechanism.

Authentication, authorization, and access control are intimately related.

In terms of the Firewall+ storage firewall design, these terms are used in this way:

Authentication is the identification step—it decides whether an entity (user or application software) is recognized. It does not seek to prove the identity in some real world manner, merely to verify to some degree of assurance that the entity is the same as is known.

Authorization uses a lookup of rights and privileges to decide whether an entity can be permitted to do some action or some set of actions.

Access control uses the authentication and authorization information to decide whether to permit the entity to a specific action at a specific time (where the time is typically at the moment the action permission is requested.)

In most designs, the authentication and authorization operations are provided by the same mechanism. In the Firewall+ architecture, this is also the case, but the default MA algorithms are designed such that these can be adjusted independently.

In addition, there are two different yet related MA models used by the Firewall+ storage firewall. One is for the application software interaction with the Firewall+ storage firewall, while the other is for the user (or some other software entity that represents the user) to "login", so the user can then be permitted to request that a Bubble protected application be started. From these two models are derived two sets of authentication mechanisms, one for the user and the other for software that intends to access the Bubble. There is a link between them, but basically they function independently. The user authentication design is simpler, so it is handled first.

Referring again to the diagram shown in FIG. 3, the key data structures and data elements are put in context to each other. These are described & explained below.

User Entity AAA

This section provides details on the way the user (device owner, or some software agent representing the user) interacts with the Firewall+ storage firewall protected device.

There is an assumption in these descriptions that the device is a USB flash drive (UFD) being used on a personal computer, perhaps one whose operating system is MS Windows XP. This interaction model is transferable and extensible to other operating systems, other platforms, and other types of protectable devices and storage media.

There is also an assumption of plug-in authentication (or plug-in AAA). In particular, while the default model is very simple, the mechanism can be easily replaced by third party user authentication. The replacement might have a more elaborate design and/or biometric mechanism, or some other innovation in identifying the user.

There needs to be a way for the user, typically a human, to authenticate himself (herself) to the Firewall+ storage firewall. In other systems, user IDs and password combinations are typical. This is also the default model used by the Firewall+ architecture.

When a user obtains a new Firewall+ protected device, such as a USB flash drive, the user has to select a user ID and password. The user interface method is not described here. The user ID and password are stored on the new device, among other data that collectively are referred to as User Registration Data.

The User Registration Data is stored in a special place inside the Bubble.

Later, when the user wants to use the device, the same user ID and password must be entered, compared to stored values in the User Registration Data.

When the user ID and password, along with possibly other data, are entered, there is another field created in the User Registration Data. This is the independent user credentials data field.

The user credentials data field is also provided to the update manager; it is used as part of that user's identity to the update server. As such, it becomes part of the licensing and/or authentication mechanism for some software applications. There may be links from some deployed application software to the User Registration Data's user credentials data field, for license verification and/or user authentication at application startup.

Software Entity AAA

This section covers all application and other software that needs read/write access to the Bubble (protected storage). This class of entity is referred to as the application or application software in this section. It might include other software such as the host computer's operating system, in some implementations.

Plug-in Authentication

The Firewall+ storage firewall architecture permits a plug-in model for AAA modules. This permits it to leverage industry standards for authentication and authorization. For different implementations, an implementer can select the third party authentication module that best meets the specific requirements. The authentication module has to be compatible with the Firewall+ architecture, but on a survey of existing available third party authentication modules, many were compatible.

The exact method used in a particular implementation will depend on which corresponding AAA library was used. The default AAA architecture is described here.

Authentication Token and Credentials Table

During the Firewall+ initiation (handshaking) transaction, application authentication and authorization take place, and the application is supplied with an authentication token (auth_token). Accompanying subsequent file access requests, the authentication token provides a sort of permission ticket for the application.

The auth_token authentication token is a hash of several values including an index to the credentials stored in the Credentials table. The index can be recovered by mapping out the other values.

The Credentials table is transient, created as needed by the Firewall+ storage firewall, generally as part of the reaction to an initiation transaction request. It stores a version of application authentication, authorization, and access credentials and rights.

In some implementations, the only reason to create and store the Credentials data is when an auth_token is created. In other implementations there will be Firewall+ internal mechanisms that also make use of this data structure.

In the simplest implementation, with only one possible application, the Credentials table will have only one data set.

The auth_token index is provided to the application, but the contents of the other Credentials table's data fields are not exposed to the user nor to the application. The Credentials data includes an index to the Rights table.

Default Authentication Module

The software AAA default authentication module uses an application_signature mechanism. This can be thought of as a password, but longer. The exact application_signature mechanism will vary across different software applications, based on the licensing requirements imposed by the software author. The key thing is the Firewall+ and the application to agree on the application's application_signature.

One application_signature scheme is for it to be the hash of a shared secret and some obtainable information. The obtainable information might include the process id (PID) of the application, a value for the current time and date, and a value for the date the application was installed to that device (i.e. the Bubble on that host computer system).

The application passes the application_signature to the Firewall+ storage firewall with the initiation request.

The application_signature, or a way to generate it, is provided to the Firewall+Rights table by the update server. Corresponding information is provided to the application either before, during, or even after the application is deployed. It is expected that the same application software on different deployments will use different shared secrets.

This default authentication module is easily extensible. Extensions might be additional information added to the hash, or differing hash algorithms used by different software applications.

Authentication Module Version Number

The initiation request (transaction) uses an authentication module version number to indicate which authentication module and/or which version of the authentication's algorithm is being used by that transaction. It is assumed that the Firewall+ storage firewall knows how to dynamically select the correct algorithm based on this version information. This assumption will only be correct if this Firewall+ storage firewall has received an appropriate code module from the update server.

Authorization Per the Rights Table

Before the application requests access, the application's access privileges (or rights) are stored in the Rights table. These are provided by the update server.

If the application will be resident within the Bubble, the Rights table generally receives authorization information when the corresponding application is provisioned (deployed) to that device or Bubble.

The application rights data stored in the Rights table represents not merely the generic application's rights to file access—this data (and the corresponding access privileges) is formed from the combination of the application's generic rights (and configuration) plus the user's rights and privileges. The update server combines these. The update sever can also be used to modify these. The updated Rights configuration is provided to the local Firewall+ in the normal update manner.

When the application sends the initiation request, the Firewall+ storage firewall uses the authorization information, to form the decision tree for subsequent authorization processing. If some level of access is to be permitted, based on a combination of application Rights and User Credentials, then an appropriate entry is made to the Credentials table, and an authentication token is returned to the application.

The authentication token, auth_token, is a hash of validating data and an index to the appropriate entry in the Credentials table. There is a link from this entry to the application's entry in the Rights table.

Access Control

After an application has been authenticated and authorized to access the Bubble, the application receives an authentication token (auth_token). This is sort of like an access ticket. It is a reference to the appropriate entry in the Credentials table.

The authentication token encapsulates or represents the application's rights to the Firewall+ storage firewall that generated it.

The interesting thing about this scheme for access control, is that the application's runtime access rights (i.e. the data in the corresponding Credentials table entry) can be changed while the corresponding authentication token is extent.

Transaction State Table

This section provides an overview of core transactions. Core transactions are those most frequently implemented, suitable for the widest set of implementations.

The transaction state table represents the request-state-action-response path of transactions. This may or may not be implemented by an actual state table in the Firewall+ storage firewall software. The transaction state table is presented in this document as a representation of the decision tree of the Firewall+ software. Other implementations of the decision tree, in addition to a state table, could be a case statement, or a set of If-Then statements, or some other language and implementation-specific option.

The way to read the state table documentation is:

when a request is received, if the current state is as shown, then the corresponding action takes place, followed by the corresponding response to the requester.

In addition, this state table documentation has a column for Flags; these provide additional information such as indicating the transaction class. These Flags are optional, and only sometimes accurate; they are provided as guides to the implementer. But in fact, all of the contents of the documented state table can be viewed as non-authoritative—the actual transactions in an implementation can be completely different. The key design element is that the Firewall+ architecture is transactional, not that there are specific transactions.

In this disclosure there are classes of requests (transactions). These class designations are for ease of design, development, and test. Depending on the implementation, there may not be a functional impact of these transaction classes. Some of the transaction classes are:

From the update server, embedded in or as part of SyncLink transaction responses;

From application software

Generated by the Firewall+ storage firewall mechanism(s) itself

For ease of design, development, and test, there may be different sets of request (transaction) handling and authentication processing for each of these Some of these transaction classes are implemented only in a software version of the architecture, others only in a Firewall+ Storage Firewall that is capable of using the SyncLink module to reach an Update Manager server.

Flag Key

Currently, only transaction class flags are provided. These are:

U—from an update server

A—from an application or other software (non-update manager, non-Firewall+ Storage Firewall)

F—from the Firewall+ Storage Firewall itself

For example, provision, update, and arbitrary-execution requests (transactions) are from the update server. These arrive by secure SyncLink. These transactions are verified (authenticated) by SyncLink methods.

TRANSACTION TABLE

| Flags | Transaction | Current state | Action | Response |
|---|---|---|---|---|
| U | Provision Transaction | Application not registered | Application is installed, Application is registered in the Rights table | Success if successful; otherwise the appropriate error code |
| U | Provision Transaction | Application already registered in the Rights table for access to this Bubble | New application is installed, old application is tagged as 'replaced'; Registration info in the Rights table is updated in parallel. On the next execution, the newer version will be used. | Success if successful; otherwise the appropriate error code |
| U | Update Transaction | Application not registered | None | Error code sent back to the update server over the SyncLink channel |
| U | Update Transaction | Application already registered in the Rights table for access to this Bubble | New application is installed, old application is tagged as 'replaced'; Registration info in the Rights table is updated in parallel. On the next execution, the newer version will be used. | Success if successful; otherwise the appropriate error code |
| U | Execution Transaction | Referred-to-Package not present or not healthy | None | Error code sent back to the update server over the SyncLink channel |
| U | Execution Transaction | Referred-to-Package previously received, present, healthy | Script instructions in the Package are executed if possible And reasonable (local discretion possible). Status result from the script is prepared for response | Success code and prepared script response are sent back to the update server over the SyncLink channel |
| A | Initiation request | Application not registered | none | Error code |
| A | Initiation request | Application registered for access to this Bubble | Entry added to credentials table, etc. authentication token generated | Authentication token passed to application for use in access calls |
| A | Request to open a file for write | Authentication token is not valid | none | Error code |
| A | Request to open a file for write | Authentication token is valid | File is already open for write, so this request must fail. | Error code |
| A | Request to open a file for write | Authentication token is valid | File is opened for write, which means an appropriate entry in the file table, etc. | Success code, file-reference (fp) is provided |

-continued

TRANSACTION TABLE

| Flags | Transaction | Current state | Action | Response |
|---|---|---|---|---|
| A | Request to open a file for read | Authentication token is not valid | none | Error code |
| A | Request to open a file for read | Authentication token is valid | File is opened for read, which means an appropriate entry in the file table, etc. | Success code, file-reference (fp) is provided |
| A | Write access request | Authentication token is not valid, or file reference is not valid for request type | none | Error code |
| A | Write access request | Authentication token is valid, and file reference is valid for request type | Data written to file | Success code |
| A | Read access request | Authentication token not valid, or file reference not valid for request type | none | Error code |
| A | Read access request | Authentication token is valid, and file reference is valid for request type | Data read from file | Success code, read file data |
| F | Health | Firewall+ Storage Firewall not healthy | Response on non-health condition prepared as response | Success code, prepared health response |

Functional Descriptions

Figure 5:
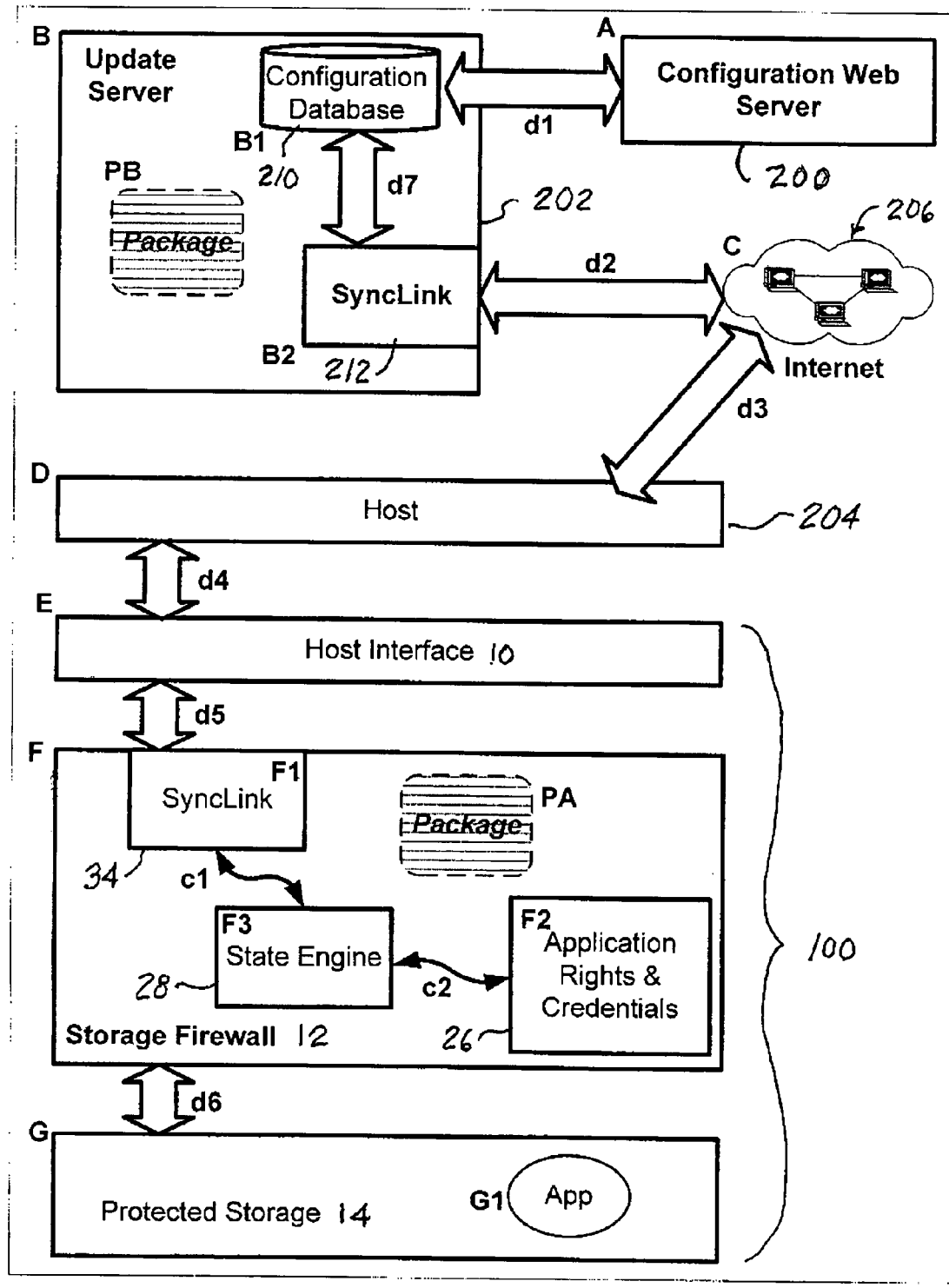
FIG. 5 is a functional block diagram illustrating a Firewall+ Storage Firewall and Remote Management System in accordance with the present invention.

Referring now to FIG. 5 of the drawing, a Remote Management System in accordance with the present invention and including a Storage Firewall Storage Device 100 as described above is shown. The system is composed of elements of a Configuration Web Server 200, an Update Server 202, a Host (Host Computer) 204, and the Storage Device 100 including the Host Interface 10, Storage Firewall 12 and Protected Storage 14.

The Internet component, as shown at 206, is not strictly speaking a component of the Remote Management System, but it is assumed to exist and be present for the System to function.

The Configuration Web Server 200 enables end users and owners to select customization options for their Storage Firewall protected storage and endpoint devices.

Update Server 202 is the remote management system's update server, providing updates, configuration changes, new software, and other information and data bundled into discrete Packages PB. The Update Server, as shown, contains a Configuration Database module 210 and a SyncLink module 212. The decision as to what information, data, software, and files to bundle into specific Packages PB depends on the information in the Configuration Database and a set of algorithms not detailed here.

The Configuration Database 210 contains configuration information about each Storage Firewall protected storage and endpoint device 100 (hereinafter called device), where such configuration information is a combination from several sources:

Class A: generic
configuration information derived from the device's serial number such as model, version, etc.,
combined with history information such as the most recent previous configuration update successfully provisioned, and Class B: user customizations
At any previous time, including just previous to an update request, the owner may have selected customizations for this device's configuration.

and Class C: derived from device status information
combined with information provided by the device regarding its operating environment, the network bandwidth for the connection, etc.

The SyncLink module 212 provides an intelligent communication channel from the Update Server to the distributed Storage Firewall protected storage and endpoint devices 100.

The Host (Host Computer) 204 is the Host that the Storage Firewall and its protected storage is currently attached to. As described above, the Host Interface 10 of a local device 100 and provides an interface between the Host and the Storage Firewall 12.

For simplicity and the purpose of this discussion, the Storage Firewall 12 is shown to include only the SyncLink module 34, the Application Rights & Credentials module 26 and the State Engine module 28.

As described above, SyncLink module 34 provides an intelligent communication channel to the remote management system's update server 202, while the Application Rights & Credentials module 26 stores, processes, and provides user and application credentials, and access parameters for authentication, authorization, and access control purposes.

The State Engine module 28 provides the execution of the transaction decision tree or state table of the Storage Firewall. All transactions are processed through the State Engine module, which decides what to do, how to respond, and which other modules and components to use to meet the requirements of the requested transaction.

The Protected Storage 14 is the storage resource being protected by the Storage Firewall 12.

There is a multi-part data path that can be followed, through the several illustrated operative parts of the system connecting the Configuration Web Server 200 to the Protected Storage 14. This path is completed by a data path d1 which connects the Configuration Web Server to the Update Server's Configuration Database 210; a data path d7 which connects the Configuration Database to the SyncLink module 212 (The data path d7 actually represents several modules of the Update Server which are not shown.); a data path d2 which connects the Update Server's module 212 to the Internet 206; a data path d3 which connects the Internet to the Host 204; a data path d4 which connects the Host to the Host Interface 10; a data path d5 which connects the Host Interface to the Storage Firewall 12;

and a data path d6 which connects the Storage Firewall to the Protected Storage 14.

Internal to the Storage Firewall 12 is a control connection and data path c1 between the SyncLink module 34 and the State Engine module 28, and a control connection and data path c2 between the State Engine module 28 and the Application Rights & Credentials module 26.

In illustrated diagram, and within the Update Server 202, a Package PB representing Packages formed within the Update Server is shown. Similarly, within the Storage Firewall 12 a Package PA, representing Packages received by the Storage Firewall, is depicted.

The Configuration Web Server 200 can be implemented using any reasonable set of web server tools, according to the navigation design provided in the Firewall+ Architecture described herein. One choice for the Configuration Web Server technologies and tools might be the Apache web server with Java backend, JavaScript coded web pages, and firewalled network integration with the Update Server's Configuration Database.

The Update Server can be implemented using any suitable software-server tool set. An example is the Apache web server with XML, SOAP, database-integration, bit-torrent (peer-to-peer, P2P) integration, and related modules integrated for data processing performance.

The design of the SyncLink protocol drives many of the implementation requirements of the Update Server. In particular, the requirement to serve up (deploy) Packages targeted at a few or one specific supported device, while also serving up Packages intended for millions of supported devices requires the support of ad-hoc P2P collaborative peer networks, based on the intended recipients of specific update Packages. While this does not change the basic architecture, it does add complexity to the design.

The Configuration Database can be implemented using any of multiple relational database designs. The basic requirements for the Configuration Database implementation are a query engine and a storage manager. Other commercially available relational database features are used in the implementation of the Configuration Database in order to improve performance and security. These include query language, views, triggers, and symbols. There are several suitable available products and technologies that can be used to provide these.

The SyncLink module 34 provides an intelligent communication medium for providing requested updates to supported devices. It is transactional, but with "fuzzy" delivery, scheduling, and packaging of the actual updates. It is designed around 2 sets of interoperable IP-based protocols.

The first set of protocols is commonly thought of as web protocols: HTTP, HTTPS, TLS (SSL), XML, SOAP and others that have been applied and/or extended to provide and support a portion of the SyncLink protocol.

The second set is derived from the bit-torrent or BitTorrent protocol (really a family of protocols). When the SyncLink module transfers a get update request to the Update Server, the Update Server attempts to reply to the requesting device as quickly as possible using the SyncLink module, using the part of the SyncLink protocol based on web-based protocols. The reply to the requesting device is a Package that may necessitate additional update requests or that may instruct the device to obtain portions of the update from other peer devices. There is flexibility in this process, directed by an intelligent module (not shown) of the Update Server. The SyncLink module's implementation permits similar requests from different devices to be replied to quite differently, in an adaptive manner, based on knowledge of network load, server load, network topology, and other factors.

The Internet component is provided by the Internet and is interfaced to by standard network equipment (not shown).

The Host (Host Computer) 204 can be a PC or any other computer, computing device, digital equipment, or analog equipment, with interfaces to the Internet and to the Storage Firewall protected storage.

When embodied in a USB flash drive, the Host Interface 10 is a USB controller. As suggested above, USB controller chips and designs are commercially available from manufacturers such as Cypress, Anchorchips, Scanlogic, and Intel.

The Storage Firewall 12 filters access from the Host to the Protected Storage component and has three relevant subsystems including the SyncLink module 34, the Application Rights & Credentials module 26 and the State Engine module 28.

The SyncLink module 34 is controlled by the State Engine module 34 which periodically uses the SyncLink module to poll a remote management system's update server for updates. When an update is received, the SyncLink module opens up the retrieved update Package PA and provides the contents of the update Package to the State Engine module for processing.

The Application Rights & Credentials module 26 is implemented as a set of data structures and operations that act on data structures which include the Application Rights Table, the Credentials Table, and the User Registration Data depicted in FIG. 3 above.

The Application Rights & Credentials module is able to store new and updated information in these data structures, and provide functionality (object functions visible to and usable by the State Engine module) to manipulate, adjust, and update the contents of it's data structures.

The State Engine module 28 is the transactional portion of the Transaction Processor 20 described above. Implementation of this module is based on a software coded state table, an implementation of the Firewall+ Storage Firewall decision tree. To save space on the chip, the decision tree is encoded in a state table. The state table has an entry for every transaction provided by the Firewall+ Storage Firewall. If the chip is an FPGA (Field Programmable Gate Array) or other field-changeable chip or chip portion, it may be possible to upgrade or replace the state table in an operational Storage Firewall's Transaction Processor component's State Engine module. This is useful to add transactions, or to improve or change the behavior of existing transactions. It can also be a security vulnerability, if an attacker is able to change transaction behavior. However, this implementation is preferred in some consumer products, to reduce product support costs.

If the chip is an ASIC (Application-Specific Integrated Circuit) or other non-field-changeable chip or chip portion, then it is not possible to upgrade or replace the state table in the field. This implementation is preferred in a highly secure product or installation, such as a military application.

The Protected Storage component 14 may be implemented as NAND Flash chips.

Major transactions are described in relation to the functional diagram. These transactions include Request and receive update for an existing application, where this update provides a modified application configuration and application rights.

The provision of basic status information by the Storage Firewall to the Update Server, prompting a more complete status report from the Storage Firewall to the Update Server.

Transaction: Request and Receive Update, for Application

This is a client-server transaction from the Storage Firewall to the Update Server.

Periodically (asynchronously) the Storage Firewall polls the Update Server for updates. There is no fixed schedule for this poll, since it is impossible to predict when or how often the Storage Firewall protected storage and/or endpoint device will be in use.

The update transaction is independent of whether the Configuration Web Server has been used to modify the records for this Storage Firewall in the Configuration Database 210.

When the Storage Firewall sends an update request transaction to an Update Server, the SyncLink module 34 selects which Update Server to contact, maintaining information that supports such contact. The update request transaction goes from the Storage Firewall's SyncLink module through the Host Interface to the Host (Host Computer), where it is packetized by the Host's network interface (not shown) to be suitable for transmission over the Internet, and sent through the Internet to the Update Server.

On the Update Server, the SyncLink module 212 receives and validates the update request transaction, interprets the update request transaction, and specifies the transaction response. The SyncLink module then packages the transaction response, the update, shown as Package PB, and directs it back to the Storage Firewall, over the Internet. (Not shown is the Update Server's network interface.) The update (the transaction response) is received by the Host 204, and passed through the Host Interface 10 to the Storage Firewall 12.

When the update is received by the Storage Firewall, it may include several elements. One of these is a Manifest (not shown), containing a list of other elements, including a software Package PA. The SyncLink module 34 opens the update, and provides the Manifest and Package PA to the State Engine module 28. The Manifest provides the State Engine with instructions, including what to do with the Package.

In this transaction example, the Package PA might contain changes to the configuration of an Application G1 stored in Protected Storage 14, as well as corresponding changes to the application rights for this Application stored in the Application Rights & Credentials module 26. The Application's configuration changes are applied by the State Engine directly to the Application by writing the received (updated) configuration file into the appropriate place within the Protected Storage. The changes to the application rights for this Application are effected by the State Engine module using the Application Rights & Credentials module 26.

Transaction Set: Basic status information to the Update Server, instruction from the Update Server to send complete status report, There is no acknowledgement message sent from the Storage Firewall 12 to the Update Server for completed update transactions, but periodically (asynchronously) the Storage Firewall sends to the Update Server basic information regarding it's status, including information on it's current configuration. This is called a Status Poll. In this way, the Update Server's Configuration Database 210 is kept up-to-date on the health, configuration, etc. of this Storage Firewall 12.

If the If the Update Server 202 is satisfied with the status information received in the Status Poll, the response will be either a basically empty acknowledgement (or some other response that elicits an Update Server directed request from the Storage Firewall 12).

If the Update Server notes a significant discrepancy from its configuration record on this Storage Firewall, or for some other reason, its reply to the Storage Firewall 12 will elicit a more complete status report. This called a Health Report, but note that it is still presented by the Storage Firewall as a request to the Update Server. The response from the Update Server to the Storage Firewall for a Health Report is formed and treated in roughly the same way as a Status Poll.

The Update Server's response to a Health Report may be intended to elicit an update request (as documented above).

Figure 6:
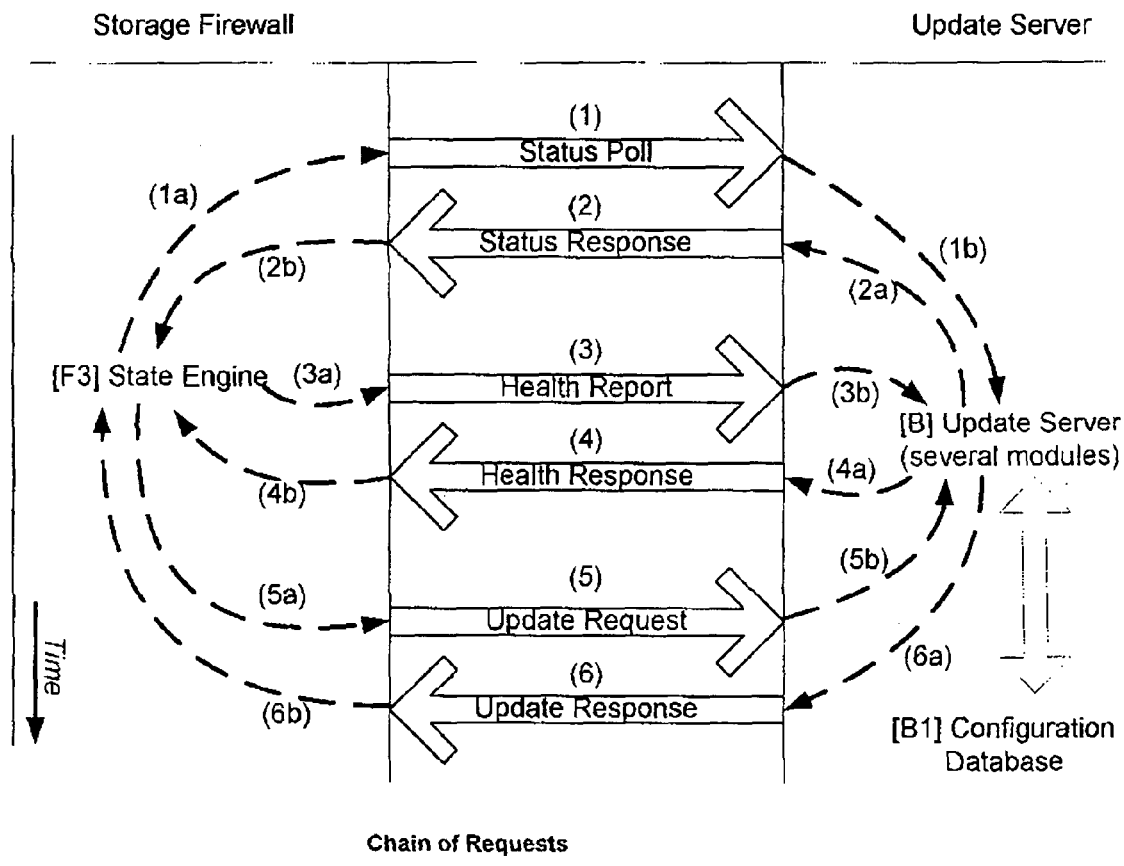
FIG. 6 is a diagram illustrating communications between a Storage Firewall and an Update Server in accordance with the present invention.

The illustrated causal chain of requests and responses is diagramed in FIG. 6.

In FIG. 6, the Status Poll (1) is generated and sent from the Storage Firewall's State Engine 28 to the Update Server.

The Status Response (2) from the Update Server 202 contains an instruction to the Storage Firewall's State Engine that elicits the Health Report request (3).

The Health transaction's response (4) contains an instruction to the State Engine that elicits the Update Request (5).

The Update Response contains the actual Update Package applied by the Storage Firewall's State Engine.

For each transaction in this chain of requests and responses, the Configuration Database 210 is provided with information from the most recent request, then information from the Configuration Database is used by the Update Server 202 to decide what instructions, if any, to put into that request's response.

Although the present invention has been described above in terms of specific exemplary embodiments, it will be understood by those skilled in the art that the disclosures herein are intended to be merely illustrative and not limiting in any way. Accordingly, the following claims are to be interpreted as covering all applications, modifications, variations and extensions as fall within the true spirit of the invention.

What is claimed is:

1. A data storage firewall apparatus for preventing writes and/or reads between a host processor and a local storage component, comprising:
   a storage firewall for communicatively coupling the local storage component and the host processor, said storage firewall being operative to provide
   application software authentication including application registration, runtime authentication of application identity and permission to execute, and/or
   user authentication and authorization in the execution of an application's request to write and/or read, and/or
   examination, verification, and authentication of all storage access requests.

2. A data storage firewall protection apparatus as recited in claim 1 wherein said storage firewall includes:
   a transaction processor component for processing storage access requests and other requests related to the administration of the storage firewall,
   a working memory component for providing local memory storage that persists across transactions,
   an encryption/decryption component for providing encryption and decryption functionality for both storage firewall processing, and encryption and decryption of data of authorized transactions, and
   an application rights & credentials component for storing, processing, and providing user and application credentials and access parameters for authentication, authorization, and access control purposes.

3. A data storage firewall protection apparatus as recited in claim 2 wherein said transaction processor component includes:
   a state engine module for providing execution of the transaction decision tree or state table of the storage firewall,
   an authentication/authorization module for providing the authentication and authorization functionality of the storage firewall, and an access controller module for providing access control for an application that requests access to the protected storage component.

4. A data storage firewall protection apparatus as recited in claim 3 wherein said transaction processor component further includes a SyncLink module for providing an intelligent communication channel to a remote management server.

5. A storage firewall and remote management system, comprising:
    a local data storage apparatus, including
        a protected storage component;
        a local host interface for coupling said protected storage component to a host processor; and
        a storage firewall adapted to communicatively couple said protected storage component to said host interface, said storage firewall being operative to provide
            application software authentication including application registration, runtime authentication of application identity and permission to execute,
            user authentication & authorization in the execution of an application, and
            examination, verification, and authentication of all storage access requests;
    a remote update server including
        a configuration database; and
        an Internet interfacing means for communicating with said local storage apparatus via the Internet to provide updates, configuration changes, new software, and other information to said local data storage apparatus; and
    a remote configuration web server coupled to said update server for enabling end users to select customization options for their storage firewall protected storage and endpoint devices.

6. A storage firewall and remote management system as recited in claim 5 wherein said storage firewall includes:
    a transaction processor component for processing storage access requests and other requests related to the administration of the storage firewall,
    a working memory component for providing local memory storage that persists across transactions,
    an encryption/decryption component for providing encryption and decryption functionality for both storage firewall processing, and encryption and decryption of data of authorized transactions, and
    an application rights & credentials component for storing, processing, and providing user and application credentials and access parameters for authentication, authorization, and access control purposes.

7. A storage firewall and remote management system as recited in claim 6 wherein said transaction processor component includes:
    a state engine module for providing execution of the transaction decision tree or state table of the storage firewall,
    an authentication/authorization module for providing the authentication and authorization functionality of the storage firewall, and
    an access controller module for providing access control for an application that requests access to the protected storage component.

8. A storage firewall and remote management system as recited in claim 7 wherein said transaction processor component further includes a SyncLink module for providing an intelligent communication channel to a remote management server.

9. A method of providing secure data storage in a computing device and for communicatively coupling and facilitating secure data exchange between a digital logic component and an associated local data storage component, comprising:
    providing a local data storage component;
    providing a host interface for coupling data stored in said local data storage component to a host processor; and
    providing a storage firewall adapted to communicatively couple said local data storage component and said host interface, said storage firewall being operative to provide
        application software authentication including application registration, runtime authentication of application identity and permission to execute,
        user authentication & authorization in the execution of an application, and
        examination, verification, and authentication of all storage access requests.

10. A method of providing secure data storage as recited in claim 9 wherein said step of providing a storage firewall includes
    providing a transaction processor component for processing storage access requests and other requests related to the administration of the storage firewall,
    providing a working memory component for providing local memory storage that persists across transactions,
    providing an encryption/decryption component for providing encryption and decryption functionality for both storage firewall processing, and encryption and decryption of data of authorized transactions, and
    providing an application rights and credentials component for storing, processing, and providing user and application credentials and access parameters for authentication, authorization, and access control purposes.

11. A method of providing secure data storage as recited in claim 10 wherein said step of providing a transaction processor component includes
    providing a state engine module for providing execution of the transaction decision tree or state table of the storage firewall,
    providing an authentication/authorization module for providing the authentication and authorization functionality of the storage firewall, and
    providing an access controller module for providing access control for an application that requests access to the protected storage component.

12. A method of providing secure data storage as recited in claim 11 wherein said step of providing a transaction processor component further includes providing an intelligent communication channel to a remote management server.

13. A method of providing a storage firewall and remote management system, comprising:
    providing a data storage means, including
        providing a host interface for coupling said storage apparatus to a host processor;
        providing a protected storage component; and
        providing a storage firewall adapted to communicatively couple said protected storage component to said host interface, said storage firewall being operative to provide
            application software authentication including application registration, runtime authentication of application identity and permission to execute,
            user authentication & authorization in the execution of an application, and
            examination, verification, and authentication of all storage access requests;

providing an update server including
a configuration database; and
an Internet interfacing means for communicating with said host computer via the Internet to provide updates, configuration changes, new software, and other information to said data storage apparatus; and
providing a configuration web server coupled to said update server for enabling end users to select customization options for their storage firewall protected storage and endpoint devices.

14. A method of providing a storage firewall and remote management system as recited in claim 13 wherein said means for providing a storage firewall includes:
providing a transaction processor component for processing storage access requests and other requests related to the administration of the storage firewall,
providing a working memory component for providing local memory storage that persists across transactions,
providing an encryption/decryption component for providing encryption and decryption functionality for both storage firewall processing, and encryption and decryption of data of authorized transactions, and
providing an application rights & credentials component for storing, processing, and providing user and application credentials and access parameters for authentication, authorization, and access control purposes.

15. A method of providing a storage firewall and remote management system as recited in claim 14 wherein said means for providing a transaction processor component includes:
providing a state engine module for providing execution of the transaction decision tree or state table of the storage firewall,
providing an authentication/authorization module for providing the authentication and authorization functionality of the storage firewall, and
providing an access controller module for providing access control for an application that requests access to the protected storage component.

16. A method of providing a storage firewall and remote management system as recited in claim 15 wherein said means for providing a transaction processor component further includes providing an intelligent communication channel to a remote management server.

17. A storage firewall for communicatively coupling and facilitating secure data exchange between a digital logic component and an associated local data storage component, comprising:
means providing application software authentication including application registration, runtime authentication of application identity and permission to execute,
means providing user authentication & authorization in the execution of an application, and
means providing examination, verification, and authentication of all storage access requests to said protected storage component.

18. A storage firewall for facilitating secure data exchange between a digital logic component and a protected data storage component, comprising:
a transaction processor component for processing storage access requests and other requests related to the administration of the storage firewall,
a working memory component for providing local memory storage that persists across transactions,
an encryption/decryption component for providing encryption and decryption functionality for both storage firewall processing, and encryption and decryption of data of authorized transactions, and
an application rights & credentials component for storing, processing, and providing user and application credentials and access parameters for authentication, authorization, and access control purposes.

19. A storage firewall as recited in claim 18 wherein said transaction processor component includes:
a state engine module providing execution of a transaction decision tree or state table of the storage firewall,
an authentication/authorization module providing authentication and authorization functionality of the storage firewall, and
an access controller module providing access control for an application requesting access to the protected storage component.

20. A storage firewall as recited in claim 19 wherein said transaction processor component further includes a SyncLink module for providing an intelligent communication channel to a remote management server.

21. A storage firewall and remote management system, comprising:
a data storage means, including
an interface for coupling said data storage means to a digital logic means;
a protected storage component; and
a storage firewall adapted to communicatively couple said protected storage component to said interface, said storage firewall being operative to provide
application software authentication including application registration, runtime authentication of application identity and permission to execute,
user authentication & authorization in the execution of an application, and
examination, verification, and authentication of all storage access requests to said protected storage component;
an update server including
a configuration database; and
an Internet interfacing means for communicating with said digital logic means via the Internet to provide updates, configuration changes, new software, and other information to said data storage component; and
a configuration web server coupled to said update server for enabling end users to select customization options for their storage firewall protected storage and endpoint devices.

22. A storage firewall and remote management system as recited in claim 21 wherein said storage firewall includes:
a transaction processor component for processing storage access requests and other requests related to the administration of the storage firewall,
a working memory component for providing local memory storage that persists across transactions,
an encryption/decryption component for providing encryption and decryption functionality for both storage firewall processing, and encryption and decryption of data of authorized transactions, and
an application rights & credentials component for storing, processing, and providing user and application credentials and access parameters for authentication, authorization, and access control purposes.

23. A storage firewall and remote management system as recited in claim 22 wherein said transaction processor component includes:
- a state engine module for providing execution of a transaction decision tree or state table of the storage firewall,
- an authentication/authorization module for providing authentication and authorization functionality of the storage firewall, and
- an access controller module for providing access control for an application that requests access to the protected storage component.

24. A storage firewall and remote management system as recited in claim 23 wherein said transaction processor component further includes a SyncLink module for providing an intelligent communication channel to a remote management server.

25. A method of providing secure data storage in an apparatus including a digital logic component and an associated data storage component, comprising:
- providing a storage firewall communicatively coupling the digital logic component and the data storage component, said storage firewall being operative to provide
  - application software authentication including application registration, runtime authentication of application identity and permission to execute,
  - user authentication & authorization in the execution of an application, and
  - examination, verification, and authentication of all storage access requests to the data storage component.

26. A method of providing secure data storage in a system including a digital logic component and a data storage component, comprising:
- using a storage firewall to communicatively couple data between the digital logic component and the data storage component, said storage firewall including means for
  - processing storage access requests and other requests related to the administration of the storage firewall using a transaction processor component,
  - providing local working memory storage that persists across transactions,
  - providing an encryption/decryption functionality for both storage firewall processing, and encryption and decryption of the data of authorized transactions, and
  - using an application rights & credentials component for storing, processing, and providing user and application credentials and access parameters for authentication, authorization, and access control purposes.

27. A method of providing secure data storage as recited in claim 26 wherein said step of processing storage access requests and other requests includes
- providing execution of a transaction decision tree or state table of the storage firewall using a state engine module,
- providing authentication and authorization functionality of the storage firewall using an authentication/authorization module, and
- providing access control for an application that requests access to the protected storage component.

28. A method of providing secure data storage as recited in claim 27 wherein said step of processing storage access requests and other requests further includes using a SyncLink module to provide an intelligent communication channel to a remote management server.

29. A method of providing a storage firewall and remote management system, comprising:
- providing a storage means including a protected storage component;
- providing a host interface for coupling data to and from a digital logic component; and
- providing a storage firewall adapted to communicatively couple said protected storage component to said host interface, said storage firewall being operative to provide
  - application software authentication including application registration, runtime authentication of application identity and permission to execute,
  - user authentication & authorization in the execution of an application, and
  - examination, verification, and authentication of all storage access requests;
- providing an update server including
  - a configuration database; and
  - an Internet interfacing means for communicating with said digital logic component via the Internet to provide updates, configuration changes, new software, and other information to said protected storage component; and
- providing a configuration web server coupled to said update server for enabling end users to select customization options for their storage firewall protected storage and endpoint devices.

30. A method of providing a storage firewall and remote management system as recited in claim 29 wherein said step of providing a storage firewall includes:
- providing a transaction processor component for processing storage access requests and other requests related to the administration of the storage firewall,
- providing a working memory component for providing local memory storage that persists across transactions,
- providing an encryption/decryption component for providing encryption and decryption functionality for both storage firewall processing, and encryption and decryption of data of authorized transactions, and
- providing an application rights & credentials component for storing, processing, and providing user and application credentials and access parameters for authentication, authorization, and access control purposes.

31. A method of providing a storage firewall and remote management system as recited in claim 30 wherein said step of providing a transaction processor component includes:
- providing execution of a transaction decision tree or state table of the storage firewall,
- providing authentication and authorization functionality of the storage firewall, and
- providing access control for an application that requests access to the protected storage component.

32. A method of providing a storage firewall and remote management system as recited in claim 31 wherein the step of providing a transaction processor component further includes providing an intelligent communication channel to a remote management server.

* * * * *